(12) United States Patent
Nara et al.

(10) Patent No.: US 8,385,600 B2
(45) Date of Patent: Feb. 26, 2013

(54) VEHICLE DRIVING ASSISTANCE APPARATUS

(75) Inventors: Norikazu Nara, Sagamihara (JP); Mikio Ueyama, Tochigi (JP); Hideyasu Kudo, Hiratsuka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 499 days.

(21) Appl. No.: 12/651,769

(22) Filed: Jan. 4, 2010

(65) Prior Publication Data

US 2010/0246889 A1    Sep. 30, 2010

(30) Foreign Application Priority Data

Mar. 24, 2009 (JP) ................................. 2009-071559

(51) Int. Cl.
 *G06K 9/00* (2006.01)
(52) U.S. Cl. ....................................... 382/104; 382/276
(58) Field of Classification Search .................. None
 See application file for complete search history.

(56) References Cited

U.S. PATENT DOCUMENTS

| | | | | |
|---|---|---|---|---|
| 6,577,334 | B1 * | 6/2003 | Kawai et al. | 348/148 |
| 7,668,341 | B2 * | 2/2010 | Miyajima et al. | 382/104 |
| 8,112,222 | B2 * | 2/2012 | Nakao et al. | 701/300 |
| 2001/0056326 | A1 * | 12/2001 | Kimura | 701/208 |
| 2008/0208460 | A1 * | 8/2008 | Nakao et al. | 701/208 |
| 2009/0024320 | A1 * | 1/2009 | Nakamura et al. | 701/210 |

FOREIGN PATENT DOCUMENTS

| | | |
|---|---|---|
| JP | 2000-105898 A | 4/2000 |
| JP | 2003-331382 A | 11/2003 |
| JP | 2007-3286 A | 1/2007 |
| JP | 2007-8281 A | 1/2007 |
| JP | 2007-240316 A | 9/2007 |
| JP | 2008-102684 A | 5/2008 |
| JP | 2008-197905 A | 8/2008 |

* cited by examiner

*Primary Examiner* — Chan S Park
*Assistant Examiner* — Nacy Bitar
(74) *Attorney, Agent, or Firm* — Crowell & Moring LLP

(57) ABSTRACT

A vehicle driving assistance apparatus has an image capturing system capturing a road on which the vehicle travels, a white line type recognition section recognizing a type of a white line that defines a current traffic lane on which the vehicle is travelling on the basis of an image captured by the image capturing system, a white line type storage section storing the white line type recognized by the white line type recognition section, a white line type estimation section and a vehicle control system. When the white line type cannot be recognized by the white line type recognition section, the white line type estimation section estimates the white line type from white line types stored in the white line type storage section. The vehicle control system executes a vehicle control on the basis of the white line type estimated by the white line type estimation section.

16 Claims, 32 Drawing Sheets

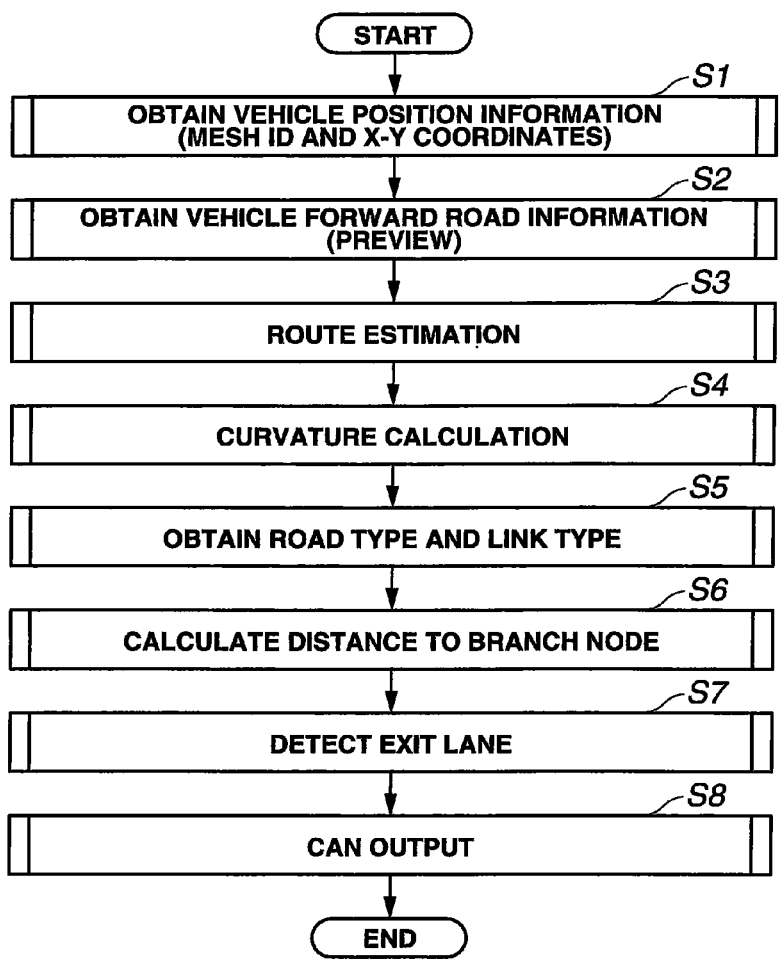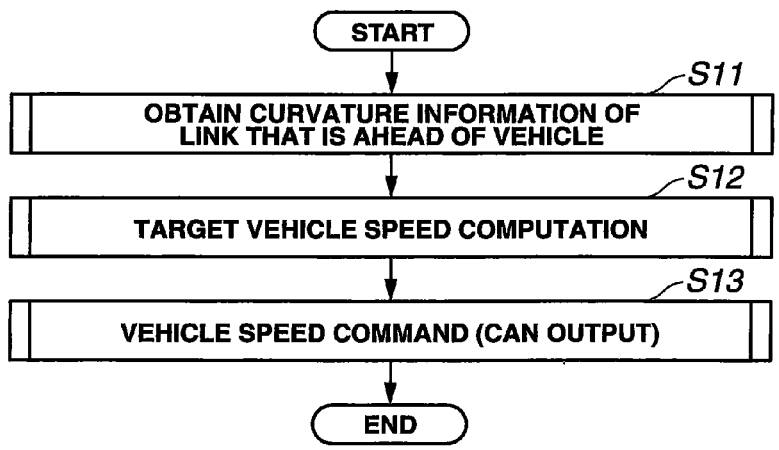

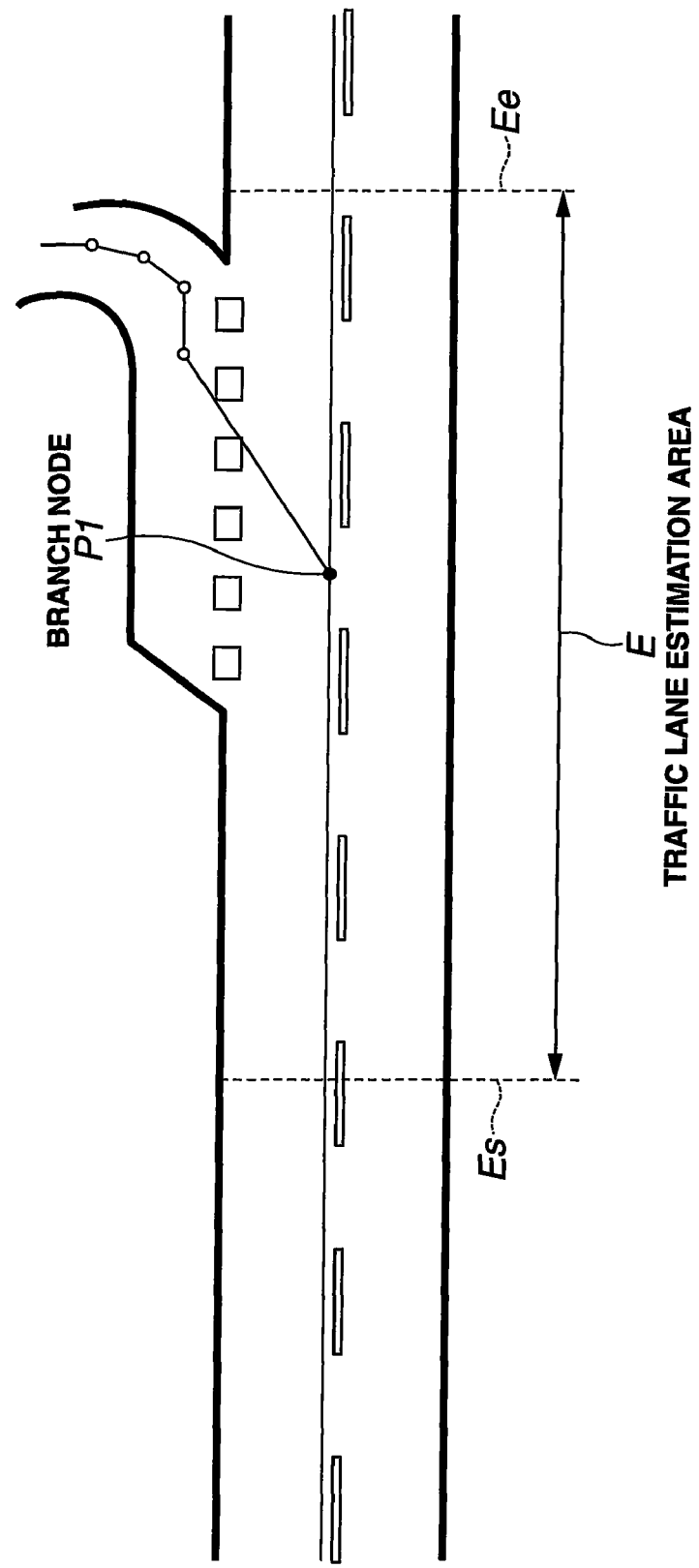

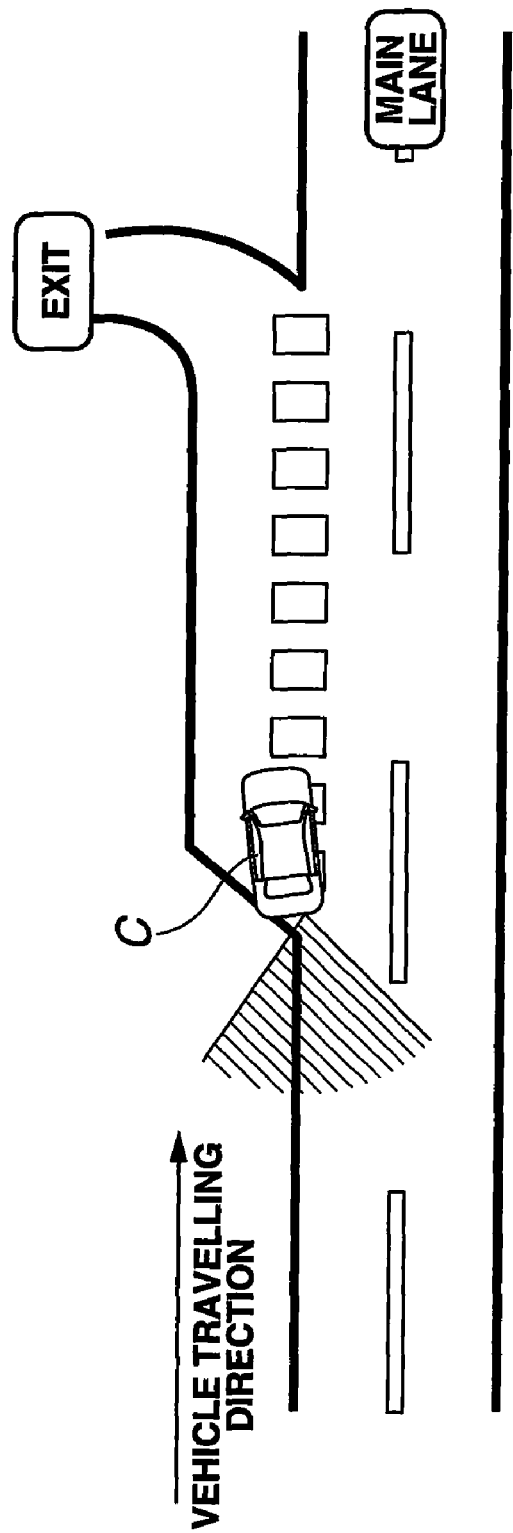

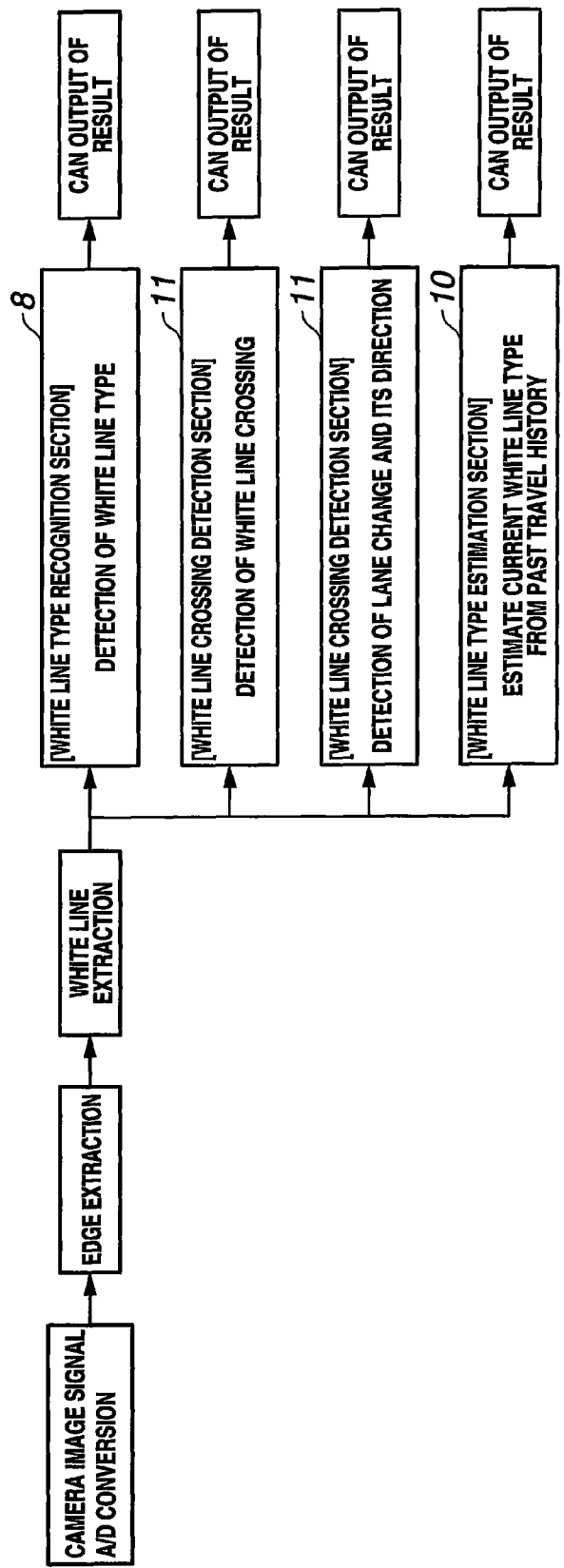

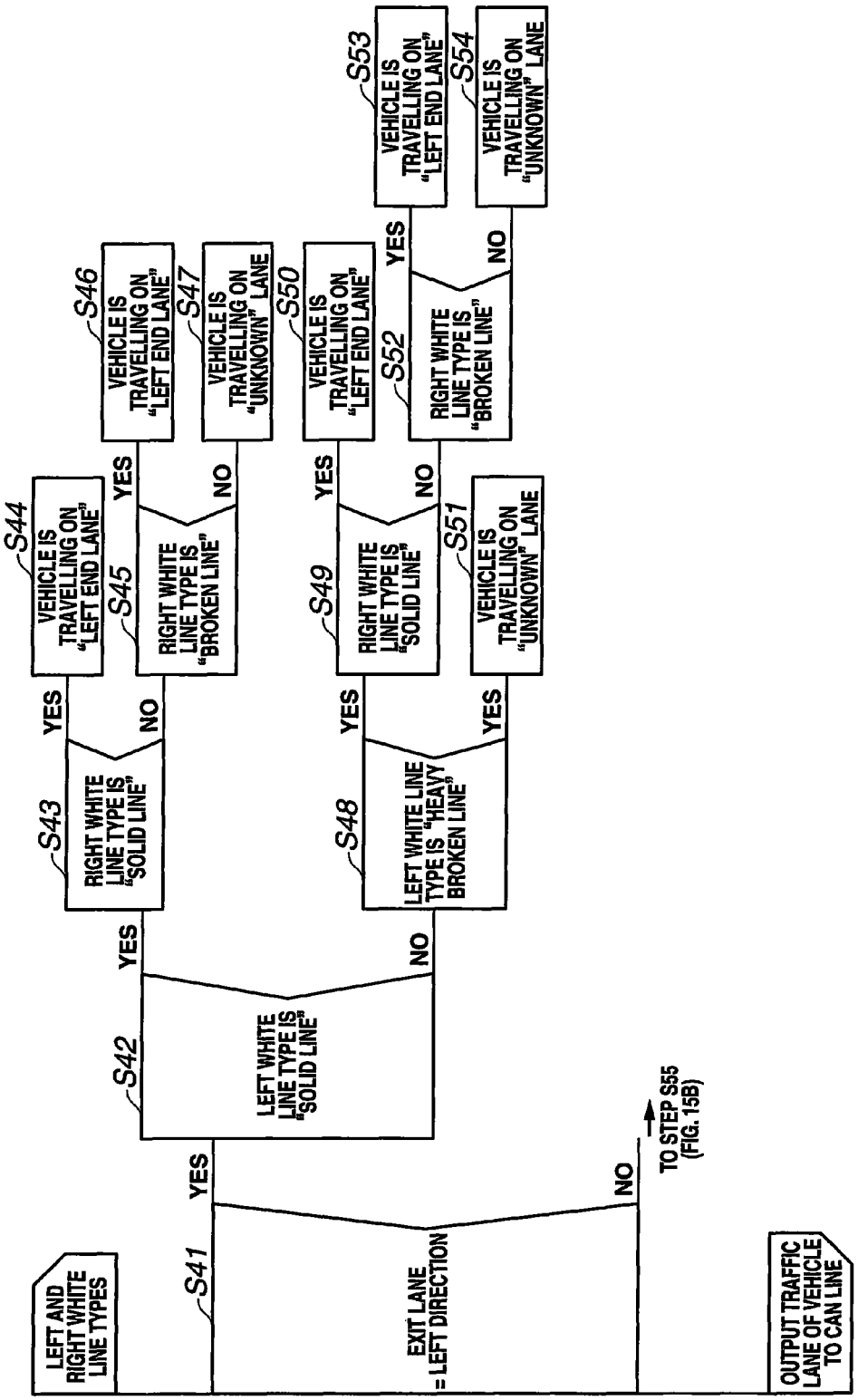

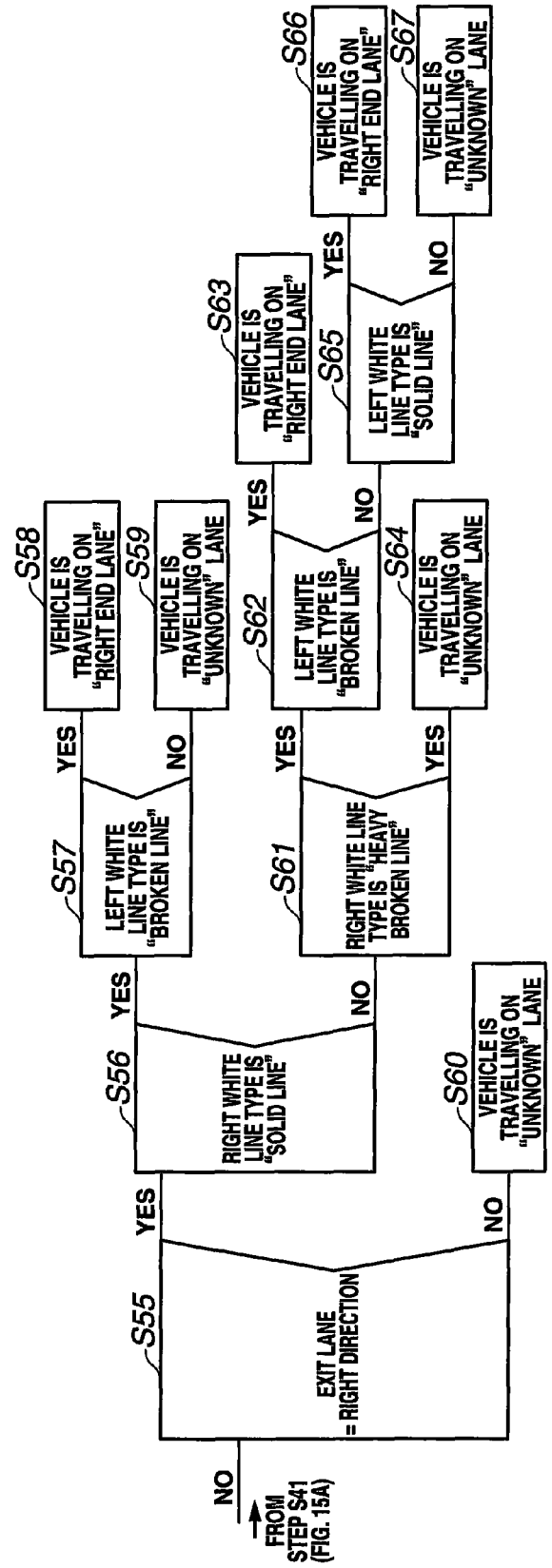

[BASIC BRANCH PATTERN]
※PATTERN SEPARATING LANES BY HEAVY BROKEN LINE

[BRANCH LANE BRANCHING OFF FROM CLIMBING LANE]

[BRANCH LANE BRANCHING OFF FROM DECELERATION LANE]

| NO. | BRANCH TYPE |
|---|---|
| 1 | IC (INTERCHANGE) |
| 2 | SA (SERVICE AREA) / PA (PARKING AREA) |
| 3 | JCT (JUNCTION) |

FIG.25

| STORED MESH ID | VEHICLE POSITION UP AND DOWN LINE ESTIMATION ZONE | RECOGNITION MANNER OF TRAVELLING DIRECTION | DIRECTION OF UP AND DOWN LINES OF TARGET POINT | BRANCH FORMATION |
|---|---|---|---|---|
| 0x63420500 | X COORDINATE 500-1000 Y COORDINATE 800-1200 | IF X COORDINATE TENDS TO INCREASE, LANE IS UP LINE | DOWN DIRECTION IS TARGET BRANCH | CLIMBING LANE TYPE |
| ...... | ...... | ...... | ...... | ...... |
| 0x63120340 | X COORDINATE 200-4000 Y COORDINATE 800-1200 | IF Y COORDINATE TENDS TO INCREASE, LANE IS DOWN LINE | UP DIRECTION IS TARGET BRANCH | DECELERATION LANE TYPE |

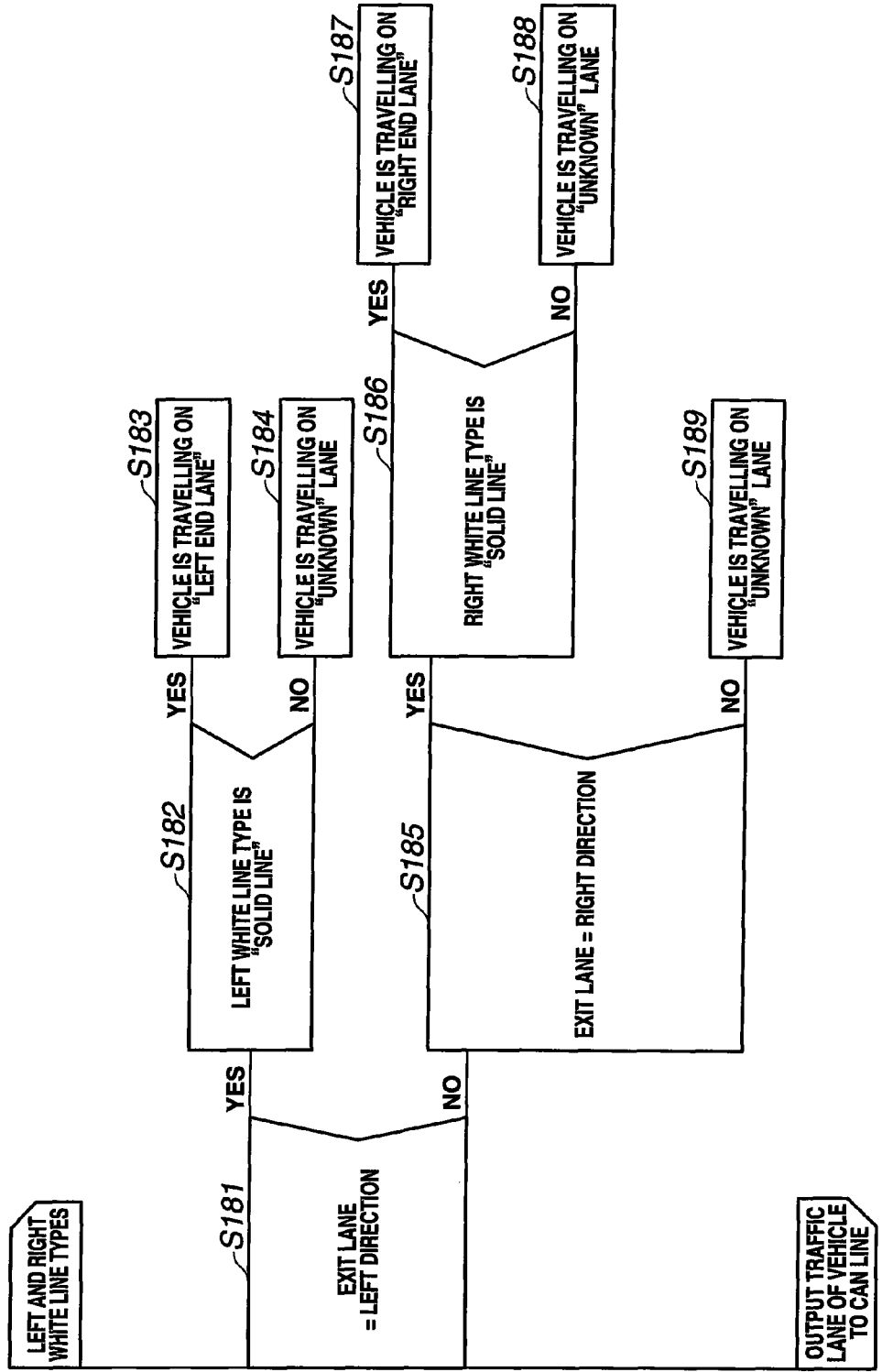

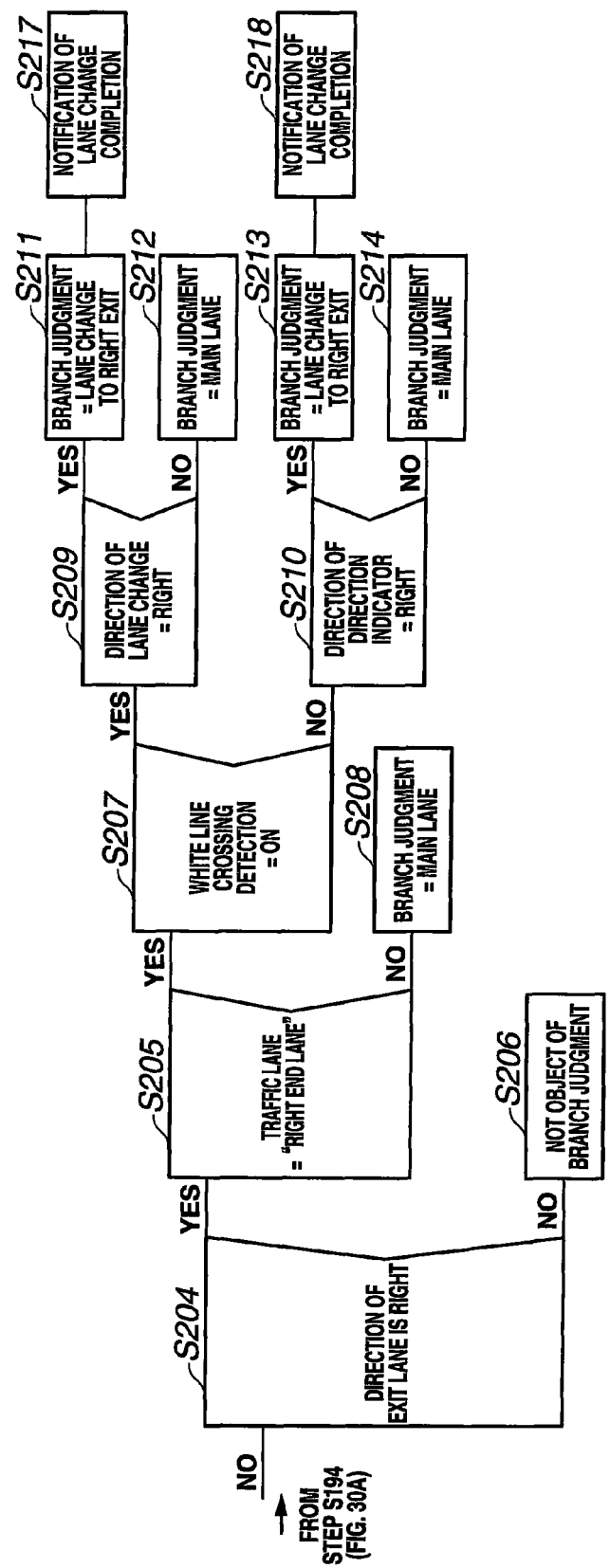

FIG.31

| NO. | IC/SA/PA BRANCH PATTERN | JUDGMENT CONDITIONS OF LEFT END TRAFFIC LANE | JUDGMENT CONDITIONS OF RIGHT END TRAFFIC LANE | INFORMATION FOR LANE CHANGE |
|---|---|---|---|---|
| 1 | BASIC TYPE | (1) LEFT WHITE LINE = SOLID LINE<br>(2) LEFT WHITE LINE = HEAVY BROKEN LINE | (1) RIGHT WHITE LINE = SOLID LINE<br>(2) RIGHT WHITE LINE = HEAVY BROKEN LINE | (1) DIRECTION INDICATOR<br>(2) INFORMATION OF HEAVY BROKEN LINE CROSSING<br>(3) LEFT AND RIGHT WHITE LINE TYPES ARE HEAVY BROKEN LINES<br>(4) INFORMATION OF SOLID LINE CROSSING |
| 2 | CLIMBING LANE TYPE | (1) LEFT WHITE LINE = SOLID LINE ALSO RIGHT WHITE LINE = HEAVY BROKEN LINE<br>(2) LEFT WHITE LINE = HEAVY BROKEN LINE ALSO RIGHT WHITE LINE = HEAVY BROKEN LINE | (1) RIGHT WHITE LINE = SOLID LINE ALSO LEFT WHITE LINE = HEAVY BROKEN LINE<br>(2) RIGHT WHITE LINE = HEAVY BROKEN LINE ALSO LEFT WHITE LINE = HEAVY BROKEN LINE | (1) DIRECTION INDICATOR<br>(2) INFORMATION OF HEAVY BROKEN LINE CROSSING<br>(4) INFORMATION OF SOLID LINE CROSSING |
| 3 | DECELERATION LANE TYPE | (1) LEFT WHITE LINE = SOLID LINE | (1) RIGHT WHITE LINE = SOLID LINE | (1) DIRECTION INDICATOR<br>(4) INFORMATION OF SOLID LINE CROSSING |

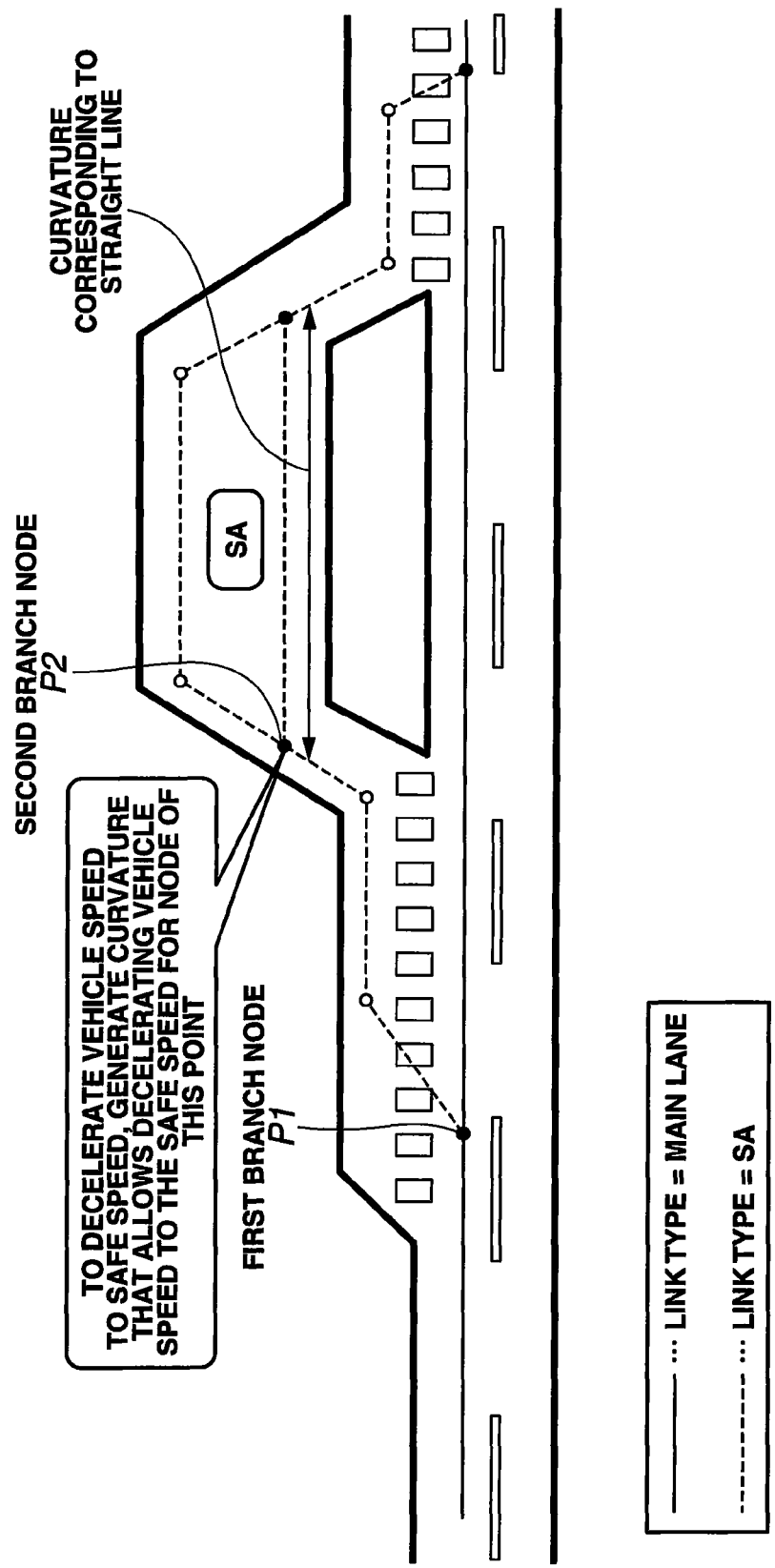

VEHICLE DRIVING ASSISTANCE APPARATUS

BACKGROUND OF THE INVENTION

The present invention relates to a vehicle driving assistance apparatus which executes a vehicle control by recognizing a traffic lane on which a vehicle is traveling in real time.

As this kind of technique, a driving assistance system which executes a vehicle control such as a lane keep control has been known. In the driving assistance system, an image of a road on which the vehicle is travelling is captured by a camera etc. and a white line on the road, which defines the traffic lane, is recognized in real time through an image recognition processing, then the vehicle control such as the lane keep control is executed.

In a high traffic place such as a freeway, there is a case where part of the white line on the road is not clear due to smudge or dirt. In this case, the recognition of the white line on the road, defining the traffic lane on which the vehicle is travelling, becomes impossible.

For this problem, Japanese Patent Provisional Publication No. 2007-008281 (hereinafter is referred to as "JP2007-008281") discloses a system in which, when the system cannot recognize the white line defining the traffic lane, tracks and expected tracks of a forward-travelling vehicle are computed, and an imaginary white line of the traffic lane is traced on the basis of these forward-travelling vehicle's tracks and expected tracks, then the traffic lane is estimated by this tracing and this estimated traffic lane is set as a target lane.

SUMMARY OF THE INVENTION

Concerning a technique of the system of JP2007-008281, in the case where the recognition of the white line on the road defining the traffic lane of the vehicle is impossible, the system estimates the traffic lane on the basis of the forward-travelling vehicle's tracks and expected tracks. Thus the system is effective in the lane keep control in which the vehicle follows the forward-travelling vehicle or a lane deviation warning control etc. However, in the system of JP2007-008281, an operation load of the real-time computation is extremely large. And besides, the technique of JP2007-008281 cannot be applied to a forward-vehicle travel-independent autonomous control, e.g. a control in which, at a branch in an interchange of the freeway, where a branch road branches off from a main lane, after recognizing the traffic lane of the vehicle and a lane change of the vehicle from the main lane to the branch road, a vehicle speed control according to a curvature of the branch road is performed. Therefore, in this point, the system of JP2007-008281 is still susceptible of improvement.

The present invention focuses attention on such problem, and an object of the present invention is to provide a vehicle driving assistance apparatus in which, even in the case where the white line on the road defining the traffic lane of the vehicle cannot be recognized due to smudge or dirt, the white line is easily estimated and an autonomous vehicle control can be executed.

The present invention focuses attention on the following point; even when the white line on the road, defining the traffic lane, cannot be recognized, as long as the vehicle does not change the traffic lane, types of left and right white lines are not changed from their preceding white line types (i.e. the types of the left and right white lines are the same as their preceding white line types). Then, the types of the left and right white lines which define a current lane on which the vehicle is travelling are recognized in real time through an image processing etc., and the recognized white line types are stored as a travel history. Further, when the white line type cannot be recognized, the type of the current white line is estimated from stored past white line type information, and on the basis of this estimation, the vehicle control is carried out.

According to one aspect of the present invention, a vehicle driving assistance apparatus comprises: an image capturing system which is installed in a vehicle and captures a road on which the vehicle travels; a white line type recognition section which recognizes a type of a white line that defines a current traffic lane on which the vehicle is travelling, on the basis of an image captured by the image capturing system; a white line type storage section which stores the white line type recognized by the white line type recognition section; a white line type estimation section which estimates the type of the white line defining the current traffic lane from white line types stored in the white line type storage section when the white line type cannot be recognized by the white line type recognition section; and a vehicle control system which executes a vehicle control on the basis of the white line type estimated by the white line type estimation section.

According to another aspect of the present invention, a vehicle driving assistance apparatus comprises: a camera which is installed in a vehicle and captures a road on which the vehicle travels; a white line pattern recognition section which recognizes patterns of white lines that are present on left and right sides of the vehicle on the road on the basis of an image captured by the camera; a vehicle-travelling traffic lane estimation section which estimates a traffic lane of the vehicle on the basis of a recognition result of the white line pattern recognition section; a white line pattern storage section which stores the white line pattern recognized by the white line pattern recognition section; a white line pattern estimation section which estimates current white line patterns on the left and right sides of the vehicle from white line patterns stored in the white line pattern storage section when the white line pattern cannot be recognized by the white line pattern recognition section; and a vehicle control system which executes a vehicle control on the basis of the recognition result of the white line pattern recognition section and an estimation result of the white line pattern estimation section, and when the white line pattern is recognized by the white line pattern recognition section, the vehicle control system performs the vehicle control on the basis of the recognized white line pattern, and when the white line pattern is not recognized by the white line pattern recognition section, the vehicle control system performs the vehicle control on the basis of the white line pattern estimated by the white line pattern estimation section.

According to a further aspect of the invention, a vehicle driving assistance apparatus comprises: a white line pattern recognition section which recognizes patterns of white lines that are present on left and right sides of a vehicle by an image captured by a camera; a branch formation determination section which recognizes presence of a branch and determines a formation of the branch on the basis of map data; a vehicle-travelling traffic lane estimation section which estimates a traffic lane of the vehicle on the basis of a recognition result of the white line pattern recognition section; a white line pattern storage section which stores the white line pattern recognized by the white line pattern recognition section; a white line pattern estimation section which estimates the white line patterns on the left and right sides of the vehicle from white line patterns stored in the white line pattern storage section when the white line pattern cannot be recognized by the white line pattern recognition section; a traffic lane change judgment section which judges a lane change of the vehicle from a main lane to a branch lane on the basis of the branch formation determined by the branch formation determination section, an estimation result of the vehicle-travelling traffic lane estimation section and the white pattern; and a vehicle control system which executes a deceleration control that decelerates a vehicle speed by driving an actuator at least after the judgment of the lane change by the traffic lane change judgment section.

In the present invention, even in the case where the recognition of the type of white line which defines the current traffic lane of the vehicle is impossible, since the type of white line can be estimated by retrieving white line type information from a past history, it is possible to continuously execute an autonomous vehicle control based on the current traffic lane of the vehicle as a continuous driving assistance.

The other objects and features of this invention will become understood from the following description with reference to the accompanying drawings.

BRIEF DESCRIPTION OF THE DRAWINGS

FIG. 7 is a flow chart showing a basic function of the navigation system of FIG. 4.

FIG. 8 is a flow chart showing a basic function of the vehicle control system of FIG. 5.

FIG. 9 is a plane view explaining a range of a traffic lane estimation area near the exit lane on the freeway.

FIG. 13 is a plane view explaining an example of a traffic lane change near the exit lane on the freeway.

FIG. 14 is a schematic function block diagram of the processing procedure of FIGS. 12A and 12B.

FIGS. 15A and 15B are flow charts showing a processing procedure executed in a vehicle-travelling traffic lane estimation section in the traffic lane estimation system of FIG. 3.

FIG. 25 is an explanation drawing that shows an example of pre-stored data form by a mesh ID.

FIG. 29 is a flow chart showing a vehicle-travelling traffic lane estimation processing for the deceleration lane type pattern of FIG. 21.

FIGS. 30A and 30B are flow charts that shows a processing procedure of a traffic lane change judgment processing for the climbing lane type pattern and the deceleration lane type pattern.

FIG. 31 is an explanation drawing showing conditions for judgment of a left end traffic lane and a right end traffic lane and conditions for judgment of traffic lane change.

FIG. 34 shows another drawing of the access lane to the service area (SA).

DETAILED DESCRIPTION OF THE INVENTION

Figure 1:
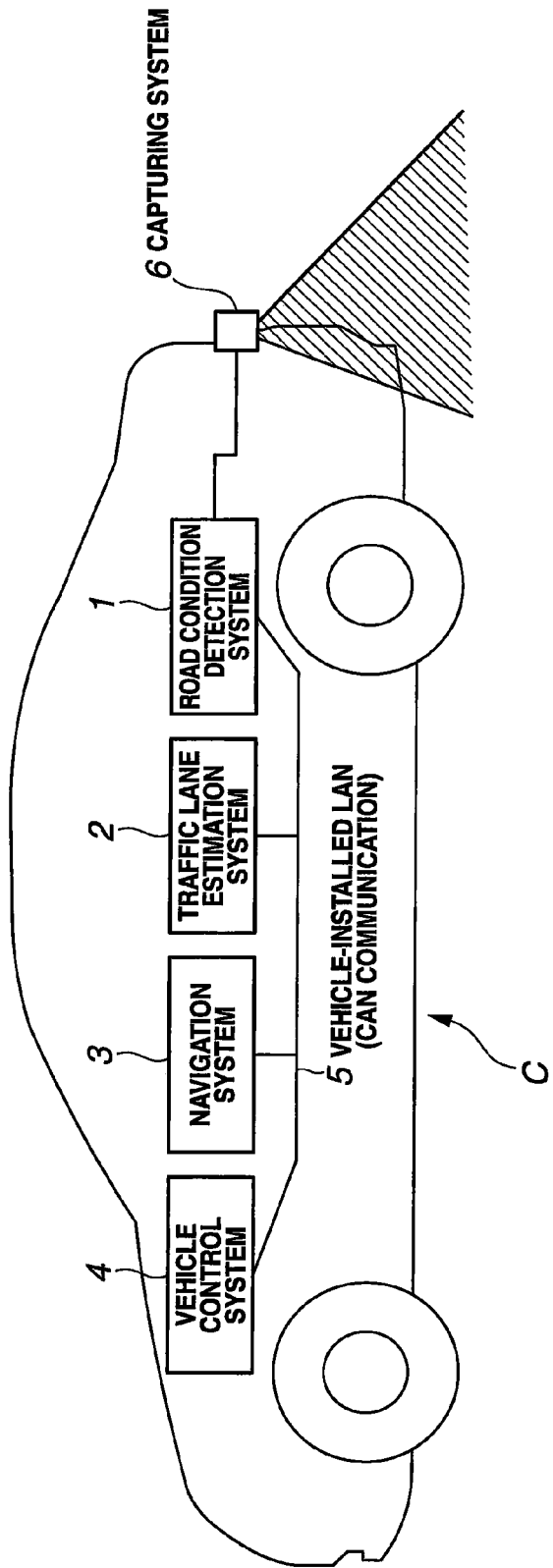
FIG. 1 is a schematic system diagram of a vehicle driving assistance apparatus of a first embodiment of the present invention.

Embodiments of the present invention will be explained below with reference to the drawings. FIGS. 1 to 18 show a first embodiment of a vehicle driving assistance apparatus. FIG. 1 is a schematic configuration of the whole of system. FIGS. 2 to 5 show an inside function block diagram of each system which forms the system of FIG. 1.

In the following, a case where a vehicle speed control according to curvature of a branch road (or branch lane) (curvature of the branch ahead) is executed will be explained. When executing the vehicle speed control during vehicle travel on a freeway, recognition of a traffic lane on which a vehicle is travelling (a traffic lane of the vehicle) and judgment whether the vehicle changes the lane from a main lane to a branch lane side of an exit road (exit lane, exit ramp) etc. are performed on the basis of after-mentioned camera information and road information from a navigation system, then in a case where the lane change to the branch lane side is recognized, the vehicle speed control according to the curvature of the branch ahead is executed.

The system in FIG. 1 mainly has a road condition detection system 1, a traffic lane estimation system 2, a navigation system 3, a vehicle control system 4 and so on in a vehicle C, and these systems are configured as a cooperative system. The systems 1~4 are connected with each other by a CAN (Vehicle-Control Area Network) line 5 which functions as a vehicle-installed LAN that is a vehicle communication line, and exchange of signals or data is carried out between each systems 1~4 through the CAN line 5.

At a rear of the vehicle, a rear camera 6 is installed as a capturing system or a capturing means to capture the road. An image captured by the rear camera 6 is loaded or inputted into the road condition detection system 1 in real time.

Figure 6:
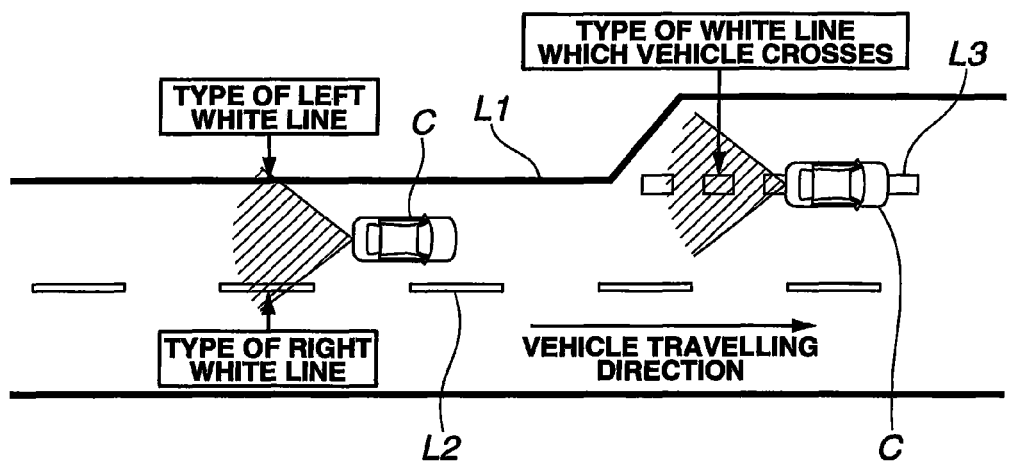
FIG. 6 is a drawing explaining a recognition state of a white line near an exit lane on a freeway.

As shown in FIGS. 1 and 6, a function of the rear camera 6 is mainly to capture or grab left and right white lines L1, L2 which define the traffic lane on which the vehicle C is travelling (the traffic lane of the vehicle C) (see the vehicle C on left side in FIG. 6). Therefore, angle and direction of the rear camera 6 are previously set so that at least the rear camera 6 can capture the left and right lines L1, L2 during the travelling of the vehicle C. Here, instead of the rear camera 6, as long as a front camera or a side camera etc. can function same as the rear camera 6, these cameras could be used.

Figure 2:
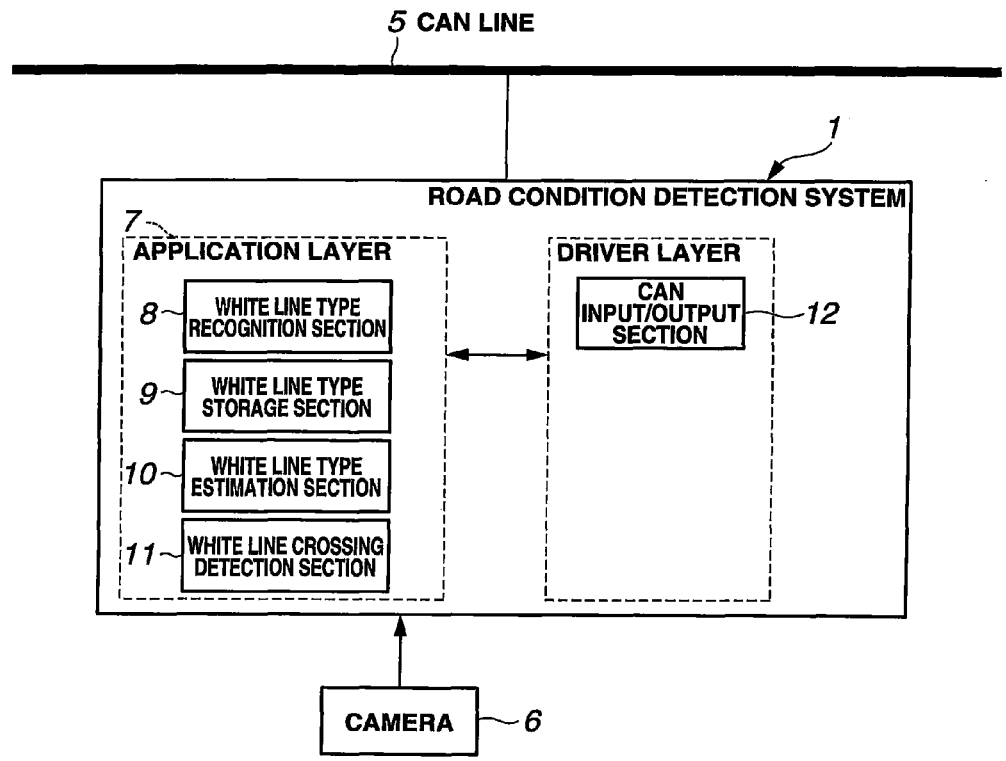
FIG. 2 is a block circuit diagram of a road condition detection system shown in FIG. 1.

The road condition detection system 1 is configured as an image recognition processing section that inputs the image from the rear camera 6. As shown in FIG. 2, the road condition detection system 1 has a white line type recognition section (a white line pattern recognition section) 8, a white line type storage section (a white line pattern storage section) 9, a white line type estimation section (a white line pattern estimation section) 10, and a white line crossing detection section 11, as an application layer 7. Further, the road condition detection system 1 has a CAN input/output section 12 as a driver layer.

The white line type recognition section 8 extracts the white line which defines a current traffic lane (i.e. a traffic lane where the vehicle travels at the present time) of the vehicle during the travelling, for example, on the freeway, and recognizes a type of the white line (a pattern of the white line). The white line type storage section 9 stores the recognized white line type. The white line type estimation section 10 estimates a type of the white line defining the current traffic lane of the vehicle C from types of the white line stored in the white line type storage section 9, when the type of the white line by the white line type recognition section 8 is unknown or uncertain. The white line crossing detection section 11 detects that the vehicle C crosses either one of the left and right white lines of the traffic lane.

As shown in FIGS. 1 and 6, the image captured by the vehicle-mounted rear camera 6 is inputted to the road condition detection system 1 in real time, and by performing a certain image recognition processing, at least the types of the left and right white lines L1, L2 defining the current traffic lane of the vehicle C can be recognized (see the vehicle C on left side in FIG. 6). In addition, when the vehicle C crosses a certain white line L3 (or the vehicle C travels on a certain white line L3 for the lane change), the lane change and its direction based on the crossing are recognized (see the vehicle C on right side in FIG. 6). These information obtained in the road condition detection system 1 is outputted to the traffic lane estimation system 2 and the vehicle control system 4 via the CAN line 5, as needed. Processing in the road condition detection system 1 will be explained in detail later.

Figure 3:
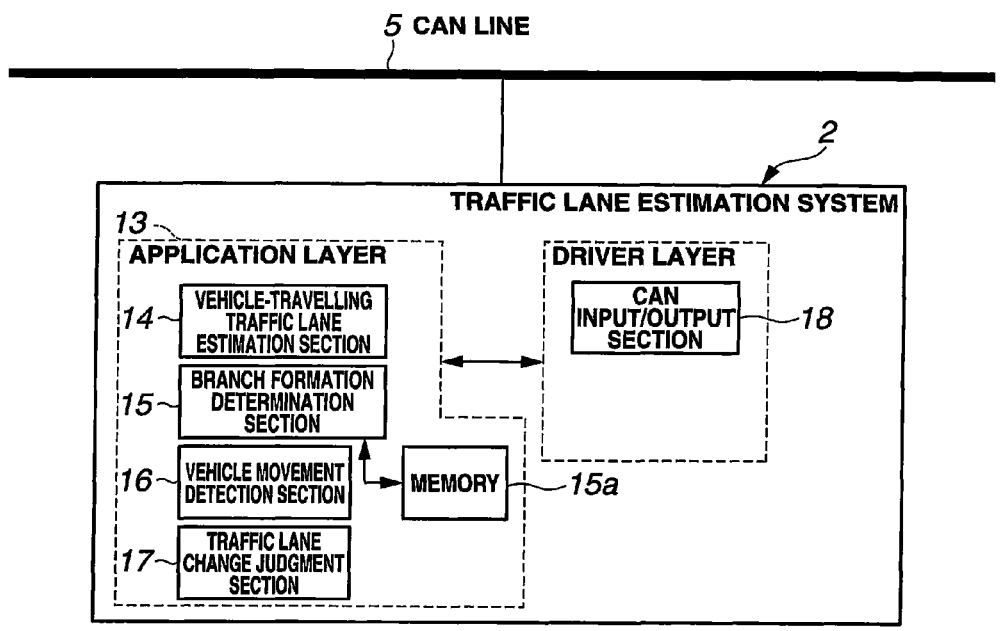
FIG. 3 is a block circuit diagram of a traffic lane estimation system shown in FIG. 1.

Regarding the traffic lane estimation system 2, it has a function of recognizing the traffic lane of the vehicle C on the basis of the information from the road condition detection system 1 etc. As shown in FIG. 3, the traffic lane estimation system 2 has a vehicle-travelling traffic lane estimation section 14, a vehicle movement detection section 16 and a traffic lane change judgment section 17, as an application layer 13, and also has a CAN input/output section 18 as a driver layer.

In addition, in the application layer 13, a branch formation determination section 15 is provided as necessary, for determining or recognizing a shape or formation of the branch that is ahead of the vehicle C in addition to the traffic lane of the vehicle C.

The branch formation determination section 15 recognizes presence of the branch such as an interchange and a junction which are ahead of the vehicle on the basis of the road information obtained from a map data 21 (see FIG. 4) in the navigation system 3, and determines its branch formation. Here, this embodiment does not require the function of the branch formation determination section 15, but in an after-described second embodiment, the branch formation determination section 15 functions effectively.

The vehicle-travelling traffic lane estimation section 14 has a function of estimating the traffic lane of the vehicle C on the basis of a recognition result of the white line type recognition section 8 and an estimation result of the white line type estimation section 10 in the road condition detection system 1. The vehicle movement detection section 16 has a function of detecting an occurrence of the vehicle movement through indication of the lane change by a driver's operation of a direction indicator (blinkers) and on the basis of outputs of a yaw rate sensor and/or a steering angle sensor which are installed in the vehicle. The traffic lane change judgment section 17 has a function of judging whether the vehicle C changes the traffic lane from the main lane to the branch lane side on the basis of the branch formation determined by the branch formation determination section 15, the traffic lane estimated by the vehicle-travelling traffic lane estimation section 14 and detection results in the white line crossing detection section 11 and the vehicle movement detection section 16. These functions of each section will be explained in detail later.

Figure 4:
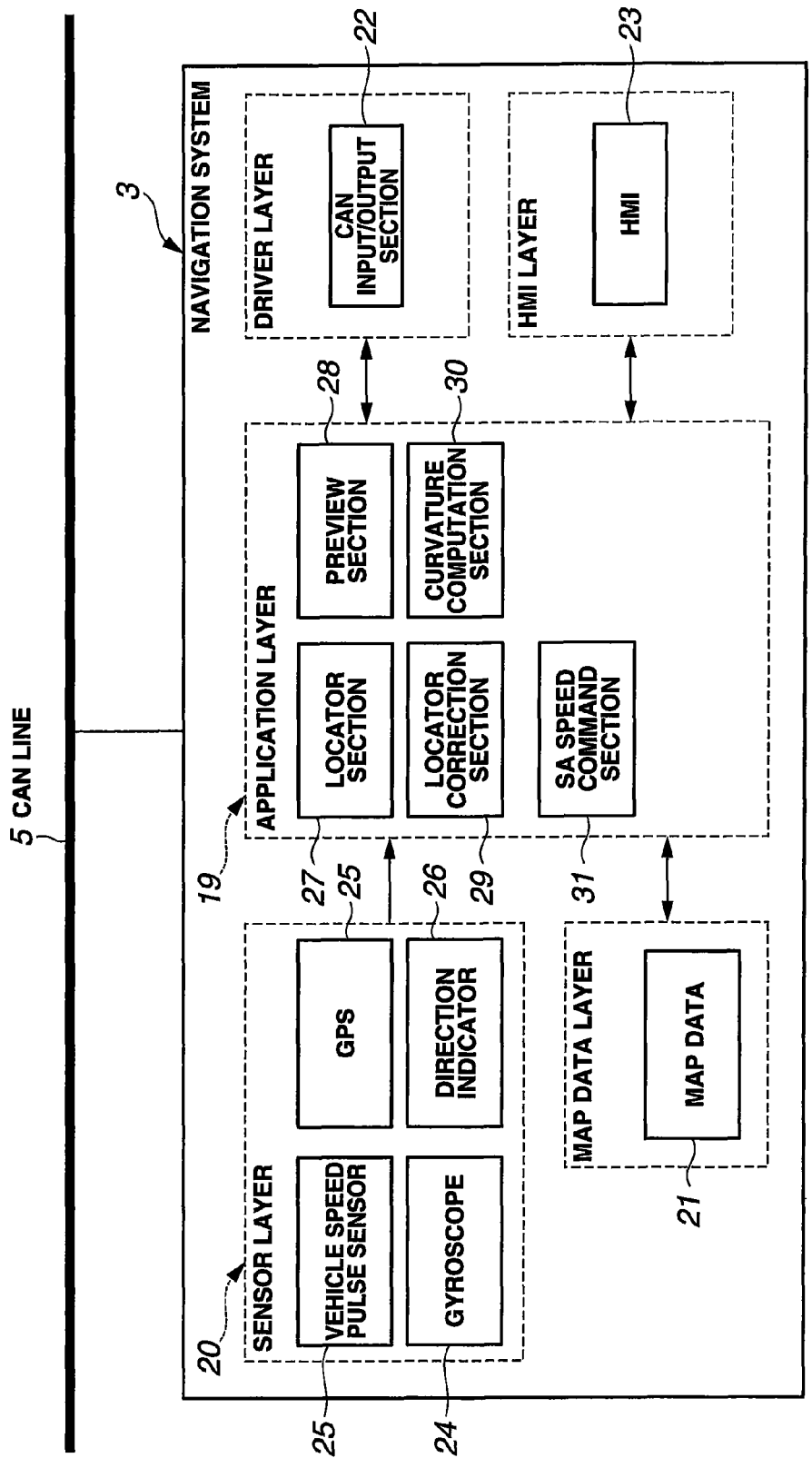
FIG. 4 is a block circuit diagram of a navigation system shown in FIG. 1.

Next, the navigation system 3 mainly has an application layer 19, a sensor layer 20, the map data (a map database) 21 as a map data layer, a CAN input/output section 22 as a driver layer, and an HMI (Human Machine Interface) section 23 as an HMI layer, as shown in FIG. 4. The map data 21 is formed by a recording medium e.g. CD-ROM, DVD or hard disk, and as we have known, map information including road attribute information and road formation information is previously stored. In this map information, not only information of the above-mentioned branch such as the interchange and the junction on the freeway, but also information about a service area (SA) and a parking area (PA), are included.

The HMI section 23 is a section that acts as operating section for each device such as a monitor (e.g. LCD (liquid crystal display)), a microphone and a speaker. Each operating switch of the navigation system 3 is included in the HMI section 23. Further, an after-mentioned voice guidance function is also included as an announcement section in the HMI section 23.

The sensor layer 20 has a gyroscope 24, a GPS tuner 25, a vehicle speed pulse sensor 25 and a direction indicator (blinkers) 26.

The application layer 19 in the navigation system 3 has a locator section 27, a preview section (a pre-read function section) 28, a locator correction section 29 and a curvature computation section 30. In addition, in the application layer 19, an SA speed command section 31 is provided as necessary. Here, this embodiment does not require a function of the SA speed command section 31, but in an after-described third embodiment, the SA speed command section 31 functions effectively.

The locator section 27 has a function of computing a vehicle position. The preview section 28 has a function of getting information of the road that is ahead of the vehicle C by accessing to the map data 21. The locator correction section 29 has a function of correcting a position of the vehicle C in accordance with the branch ahead at the interchange etc. on the basis of a judgment result by the traffic lane change judgment section 17 shown in FIG. 3. The curvature computation section 30 has a function of computing the curvature of the curve that is ahead of the vehicle C. The SA speed command section 31 has a function of outputting a proper speed command for the service area (SA) or the parking area (PA), when the vehicle C is judged to go into the service area (SA) or the parking area (PA). These functions of each section will be explained in detail later.

In the navigation system 3, as a basic function, after determining the position of the vehicle C through sensor information from the gyroscope 24 and the GPS tuner 25 etc., a path or route where the vehicle C travels is estimated (so-called route estimation function), and a value of curvature of the estimated route is calculated by computation. Furthermore, in a case where the branch lane or a branch point (a branch node), where the vehicle C is going into, exists ahead of the vehicle C on the estimated route, a distance to the branch node is determined by calculation, and also a direction of the branch ahead with respect to the main lane is determined or recognized. These information is outputted to the traffic lane estimation system 2 and the vehicle control system 4 via the CAN line 5 in a constant period.

Figure 5:
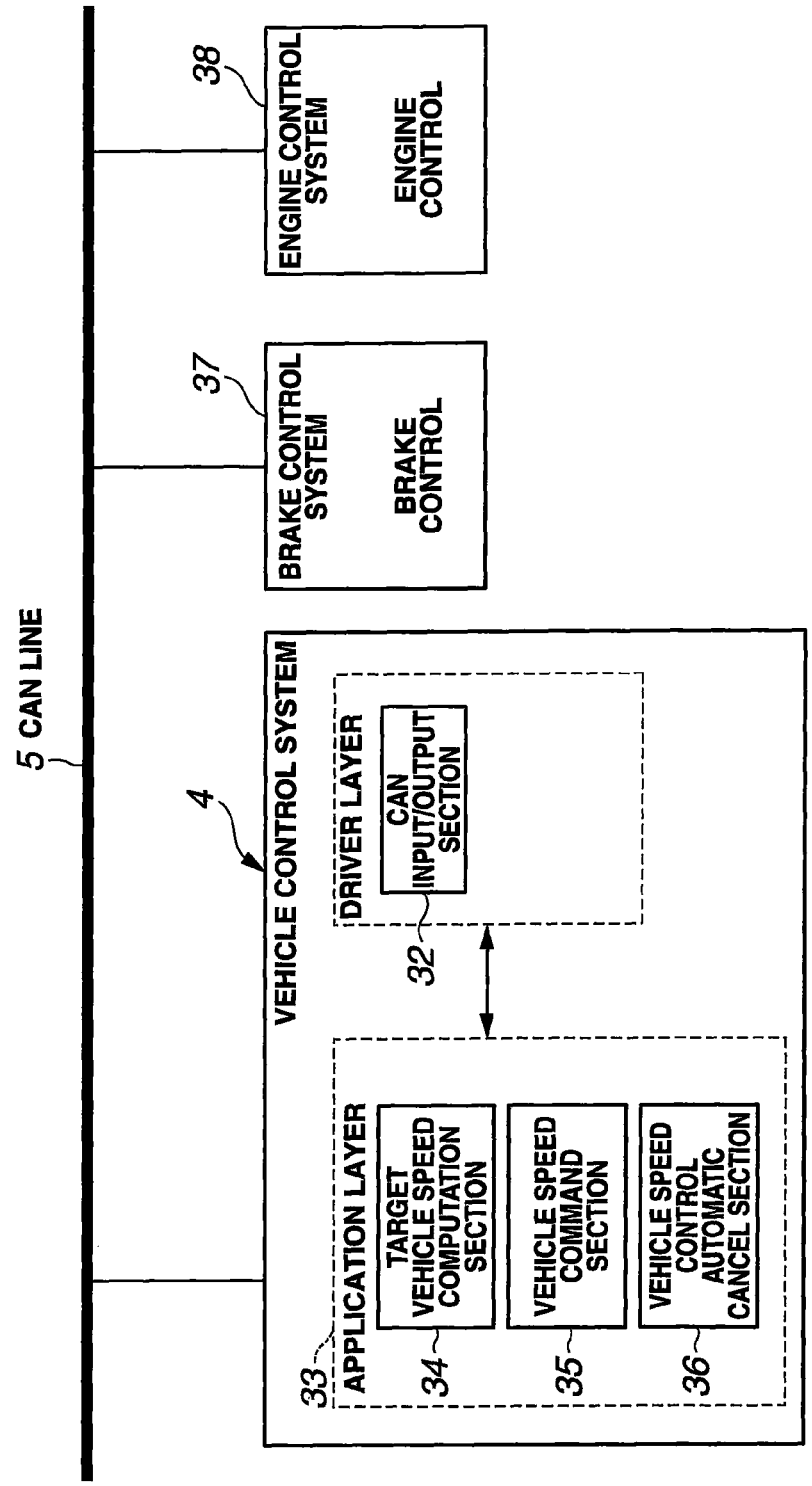
FIG. 5 is a block circuit diagram of a vehicle control system shown in FIG. 1.

Next, as shown in FIG. 5, the vehicle control system 4 has a CAN input/output section 32 as a driver layer, a target vehicle speed computation section 34 and a vehicle speed command section 35, as an application layer 33. In addition, in the application layer 33, a vehicle speed control automatic cancel section 36 is provided as necessary. Here, this embodiment does not necessarily require a function of the vehicle speed control automatic cancel section 36, same as the above branch formation determination section 15 and SA speed command section 31, but in the third embodiment, the vehicle speed control automatic cancel section 36 functions effectively.

As described above, in the case where the presence of the curve having a certain curvature which is ahead of the vehicle C on the estimated route is recognized, the target vehicle speed computation section 34 determines an optimum target vehicle speed according to the curvature of the curve by computation. After determining the target vehicle speed, the vehicle speed command section 35 outputs a vehicle speed command according to the target vehicle speed, as a deceleration command, to a brake control system 37 and an engine control system 38 via the CAN line 5.

With this command, for instance, the brake control system 37 drives a brake actuator (not shown), and the engine control system 38 drives a throttle actuator (not shown), then a vehicle speed control in a so-called automatic vehicle speed mode is executed so that a current vehicle speed becomes the target vehicle speed. In the present invention, although the brake control system 37 and the engine control system 38 are shown as an embodiment, an automatic transmission control system could be included as a vehicle speed control system except these systems.

As will be described later, the vehicle speed control automatic cancel section 36 in FIG. 5 has a function of automatically cancelling the above vehicle speed control with consideration given to safety, for example when the vehicle C goes into a specific area such as the service area (SA) and the parking area (PA).

Next, with regard to each system shown in FIGS. 2 to 5, namely the navigation system 3, the road condition detection system 1, the traffic lane estimation system 2 and the vehicle control system 4, their function will be explained with reference to the respective flow charts from FIG. 7.

As shown in FIG. 7, in the navigation system 3, vehicle position information is obtained from a vehicle speed signal from the vehicle speed pulse sensor 25 and sensor information from the gyroscope 24 and the GPS tuner 25 in a specific period (at step S1). Map data around the vehicle C, including vehicle forward road information, is collected by a so-called preview function (at step S2). The route where the vehicle C travels is estimated from the collected map data by a so-called route estimation function (at step S3). Regarding a method of the route estimation, as we have known, in a case where a target place (target point) is set in the navigation system 3, since a guided route from the vehicle position to the target place is indicated, the guided route is set as the estimated route.

On the other hand, in a case where the target place is not set in the navigation system 3, a type of road (e.g. national highway or prefectual road) ahead of and behind the branch point (the branch node), or a link type, is compared, then a link (route) of the same road type or the same link type is first selected. Here, in a case where there is no difference in the road type or the link type between the links ahead of and behind the branch node, a link (route) having a small link angle is selected and this route is set as the estimated route.

After the route of the vehicle C is estimated, a value of the curvature of the estimated route is calculated by the computation in the curvature computation section 30 (at step S4).

Further, in the case where the branch point (the branch node), where the vehicle C is going into, exists ahead of the vehicle C on the estimated route, e.g. in the case where the branch point such as interchange and junction, where vehicle C is going into, exists ahead of the vehicle C on the freeway, information about the road type and the link type around the branch node is obtained (at step S5), and a distance to the branch node is determined by computation (at step S6). And a direction of the branch ahead with respect to the main lane (e.g. a direction of the exit lane with respect to the main lane in the interchange, or a direction of an entrance lane of the service area (SA) or the parking area (PA) with respect to the main lane) is detected or recognized (at step S7). Then these information is outputted to the traffic lane estimation system 2 and the vehicle control system 4 via the CAN line 5 in the constant period (at step S8).

In the vehicle control system 4 getting such information from the navigation system 3, as shown in FIG. 8, a target vehicle speed according to the curvature information of the link ahead of the vehicle is computed in the target vehicle speed computation section 34 (at steps S11, S12). Then the command of the target vehicle speed is outputted from the vehicle speed command section 35 to the brake control system 37 and the engine control system 38 via the CAN line 5 (at step S13).

With this, as mentioned above, for instance, the brake control system 37 drives the brake actuator, and the engine control system 38 drives the throttle actuator, then the vehicle speed control in the so-called automatic vehicle speed mode is executed so that the current vehicle speed becomes the target vehicle speed.

Concerning this case, for example, at the branch in the interchange as shown FIG. 6, in order to perform the vehicle speed control after checking that the vehicle C goes into the exit lane of the interchange, the traffic lane of the vehicle C must be recognized previously, prior to the checking. Although the estimation of this traffic lane of the vehicle C is executed by the traffic lane estimation system 2 shown in FIG.

3 (this will be explained later), as shown in FIG. 9. a traffic lane estimation area E is previously set, and the traffic lane estimation of the vehicle C by the traffic lane estimation system 2 is executed for only this traffic lane estimation area E. As can be seen in FIG. 9, the traffic lane estimation area E is set as an area ahead of and behind a branch node P1. More specifically, the traffic lane estimation area E is set as a range from a traffic lane estimation start position Es (e.g. a position behind the branch node P1 by a few tens of meters) to a traffic lane estimation end position Ee (e.g. a position ahead of the branch node P1 by a few tens of meters). By setting the traffic lane estimation area E and executing the traffic lane estimation, a load of the traffic lane estimation system 2 can be lightened, as compared with a case where the traffic lane estimation is executed all the time.

Further, as is known, since road data included in the map information collected/obtained by the preview section 28 in the navigation system 3 is basically formed by a node that indicates coordinates of a crossing (or intersection) and the branch point and a link that connects these nodes (an interpolation point (a interpolation node) similar to the node might be set between the nodes), the value of the curvature of the estimated route is defined as an angle formed by links behind and ahead of a certain node or as a value (a radius of curvature) calculated by a specific arithmetic expression on the basis of the angle. Here, the value of the curvature could be previously stored in the map data 21 with the curvature value linked with each node.

Figure 10:
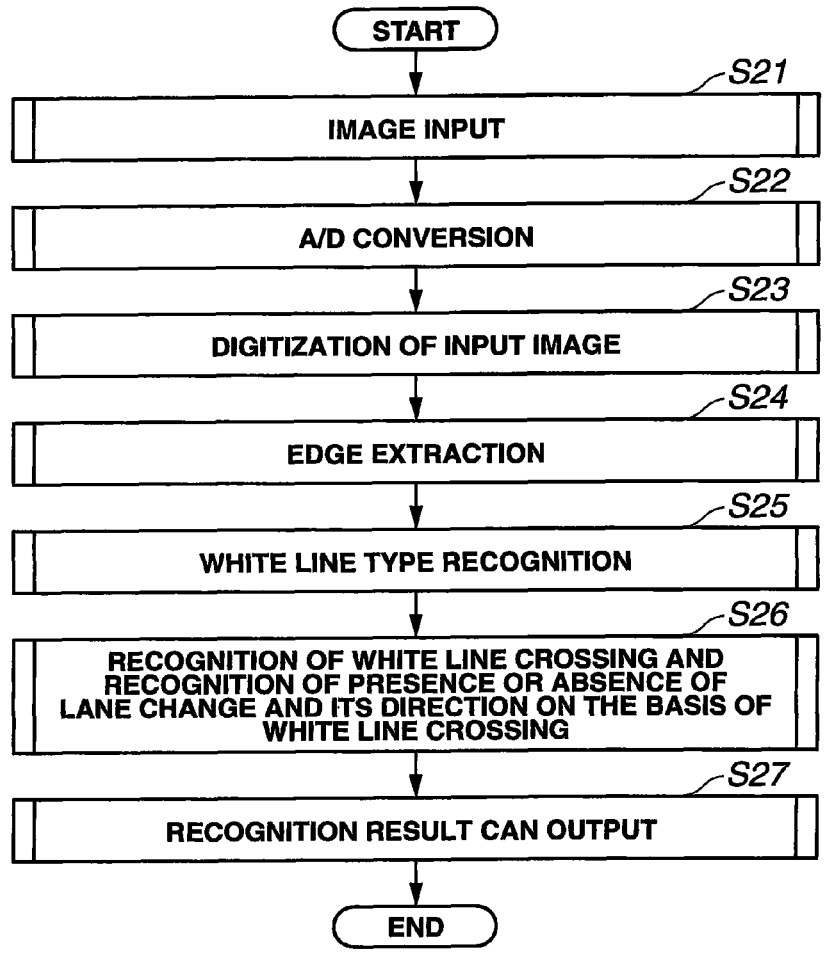
FIG. 10 is a flow chart showing a basic function of the road condition detection system of FIG. 2.

On the other hand, as for the road condition detection system 1, as shown in FIG. 10, the image of the road, captured by the rear camera 6 installed in the vehicle C, is inputted into the road condition detection system 1 in real time (at step S21). An A/D conversion of the input image and a digitization of the input image are performed in a predetermined period (at steps S22, S23). Edges of the left and right white lines (see the vehicle C on left side in FIG. 6) defining the current traffic lane of the vehicle C is extracted from the image, and only its white line part is substantially extracted (at step S24). And a white line type judgment is carried out by the pattern recognition and other image recognition processing, then the types of the left and right white lines are detected, namely that the types of the left and right white lines are judged or recognized (determined or identified) from 6 types of FIG. 11 (at step S25). These processing are executed in the white line type recognition section 8 in the road condition detection system 1.

Furthermore, as will be described later, in the case where the vehicle C crosses a certain white line, the presence or absence of the lane change and the direction are recognized by this crossing (at step S26). These results are then outputted to the traffic lane estimation system 2 etc. via the CAN line 5 (at step S27).

Figure 12A:
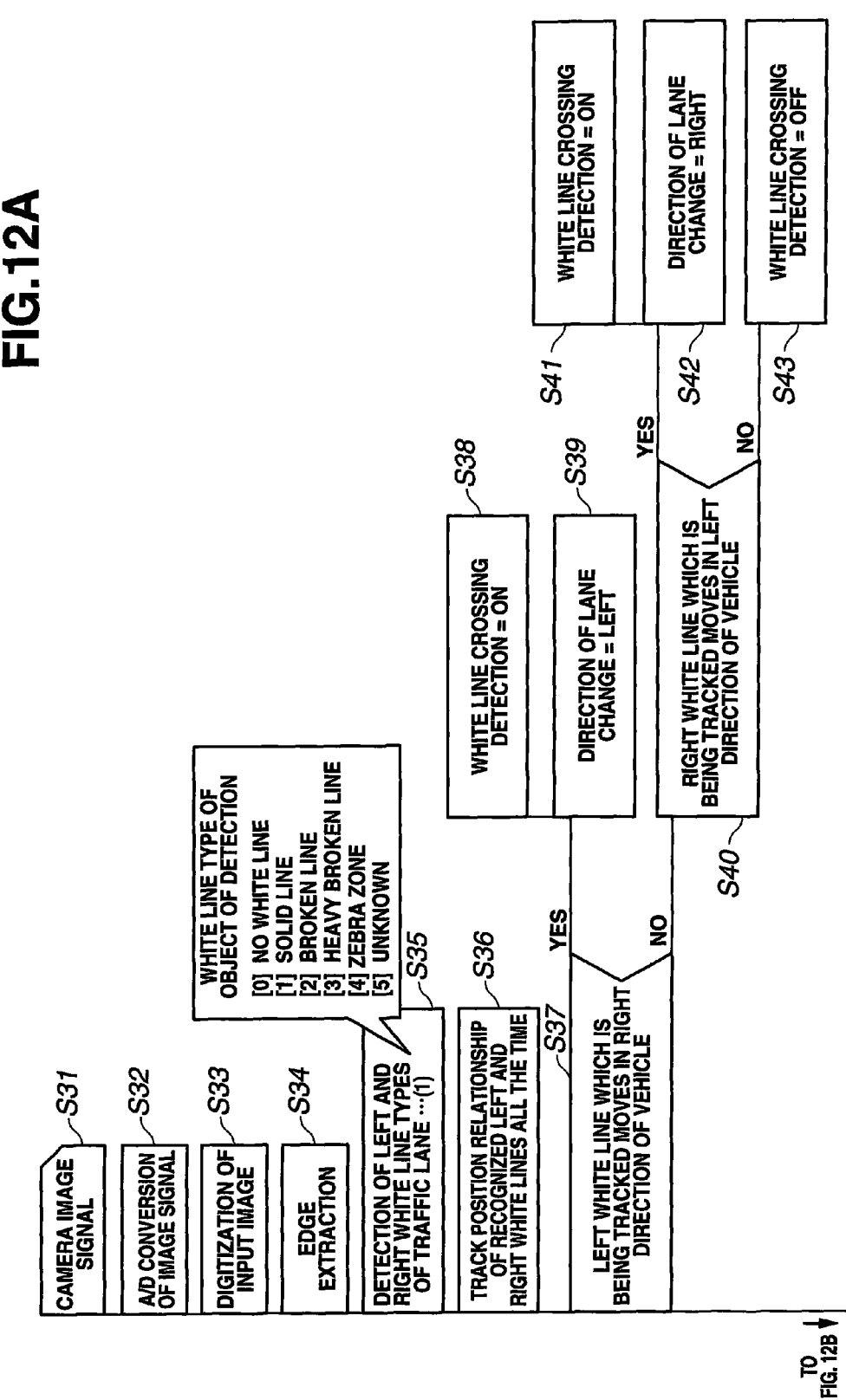
FIGS. 12A and 12B are flow charts showing a processing procedure executed in the road condition detection system of FIG. 2.
Figure 12B:
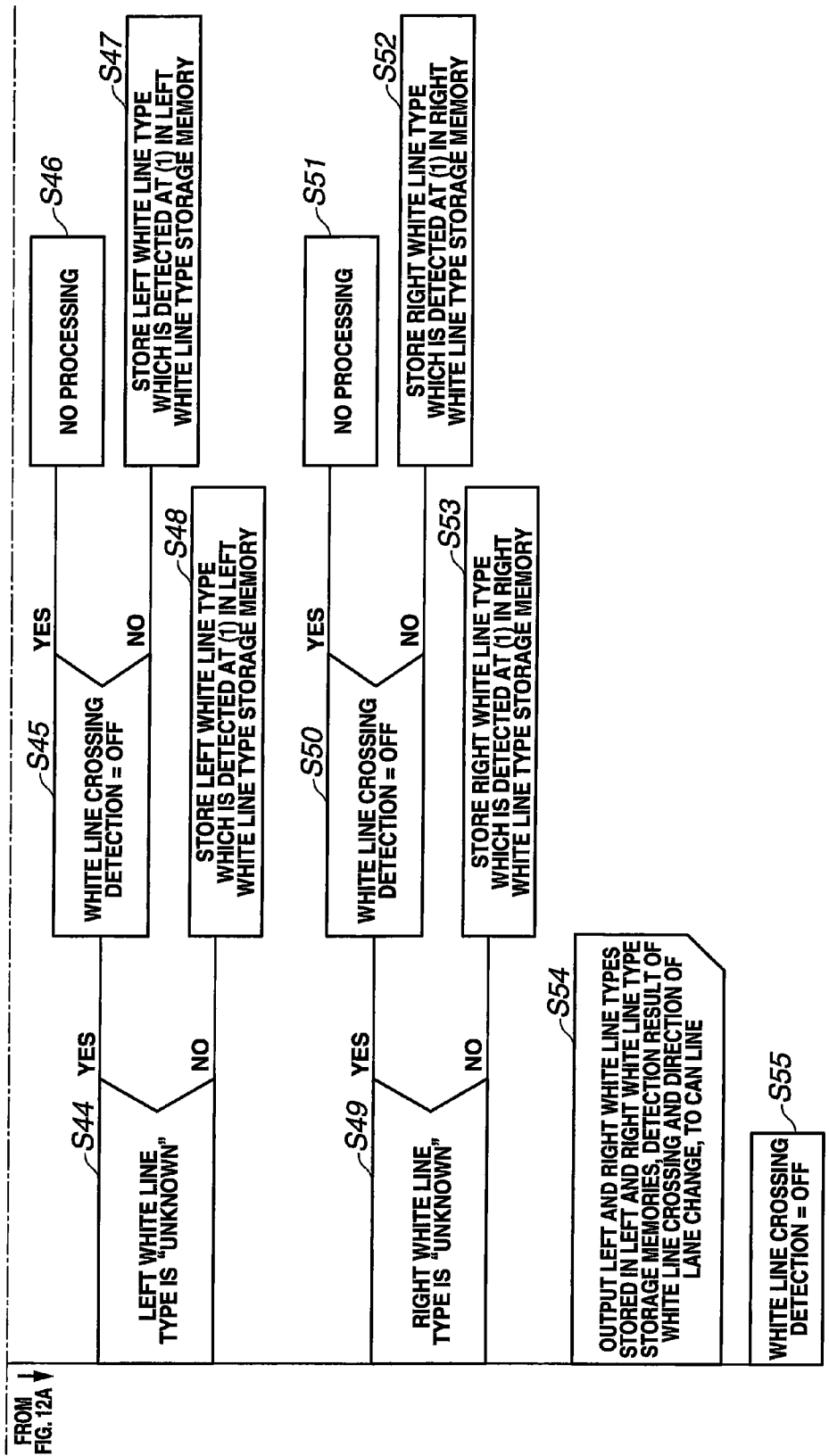

A detailed flow chart of FIG. 10 is shown in FIGS. 12A and 12B.

Steps S31~S35 in FIG. 12A are the same as steps S21~S25 in FIG. 10. A recognition result of the white line type by the white line type recognition section 8, i.e. a recognition result of types of the left and right white lines, which define the traffic lane where the vehicle C travels at the present time, is written into and stored in the white line type storage section 9 in the road condition detection system 1 as a travel history data at after-mentioned steps S48 and S53, each time the routine proceeds to steps S48 and S53. That is, since the white line type storage section 9 in the road condition detection system 1 is configured to store/gather the recognition result of types of the left and right white lines one by one as the data based on the travel history of the vehicle C, the recognition result of types of the left and right white lines by the white line type recognition section 8 is written into left and right separate white line type storage sections 9, each time the routine proceeds to these steps.

Figure 11:
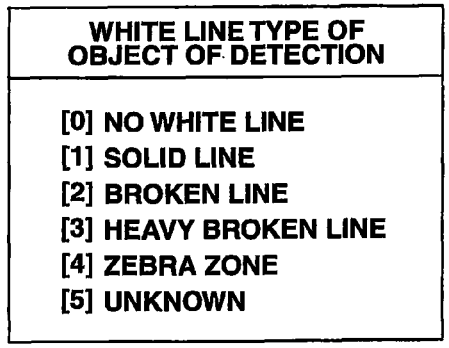
FIG. 11 is a drawing explaining types of white line, which should be detected.

Here, for example, the white line type that should be recognized on the freeway is shown in FIG. 11, which is used for indication of a vehicle traffic zone. A "heavy broken line" is defined as a vehicle traffic zone outermost line that is painted near the entrance and exit lanes on the freeway etc. (see FIGS. 6 and 9). A "no white line" in FIG. 11 means that the white line is not recognized. However, this "no white line" differs from an after-mentioned "unknown (or uncertain)" that means that the type of the white line is unknown or uncertain. That is, "no white line" means that the white line itself cannot be detected, whereas "unknown (or uncertain)" ("the type of the white line is unknown (or uncertain)") means that although the white line can be detected as the white line, its type (e.g. a solid line or a broken line) cannot be judged or identified.

When the types of the left and right white lines of the vehicle C are recognized, the white line crossing detection section 11 in the road condition detection system 1 tracks (traces) a position relationship of the recognized left and right white lines all the time (at step S36 in FIG. 12A). Then, for instance, as indicated at step S37, if the left side white line which is being tracked moves or shifts in a right direction of the vehicle C by "white line crossing" of the vehicle C (the vehicle C crosses the white line), the white line crossing detection section 11 instantly detects "direction of the lane change=left" (detects that the vehicle C moves to the left side lane) by "white line crossing detection=ON" (at steps S38, S39).

This will be explained in detail below. For instance, as shown in FIG. 6, during the travelling near the branch to the exit lane side in the interchange, when the vehicle C, which travels while identifying the left side white line as "solid line (L1)" and the right side white line as "broken line (L2)" until the exit lane comes, changes the direction to the left side after identifying the left side white line as "heavy broken line (L3)", the white line crossing detection section 11 judges that the vehicle C crosses the left side "heavy broken line". Then, with this judgment, the above "lane change in the left direction" of the vehicle C is detected.

Likewise, as shown in FIG. 13, during the travelling near the branch to the exit lane side in the interchange, when the vehicle C that travels while identifying the left side white line as "solid line" and the right side white line as "broken line" until the exit lane comes changes the direction to the left side, the white line crossing detection section 11 judges that the vehicle C crosses the left side "solid line" before recognizing or identifying the "heavy broken line". Thus, with this judgment, the above "lane change in the left direction" of the vehicle C is detected.

These manners are completely the same for the case where the vehicle C crosses the right side white line. As indicated at steps S40~S42 in FIG. 12A, if the right side white line which is being tracked moves or shifts in a left direction of the vehicle C by "white line crossing" of the vehicle C (the vehicle C crosses the white line), the white line crossing detection section 11 instantly detects "lane change in the right direction" of the vehicle C by "white line crossing detection=ON".

In the above explained recognition process of the white line type, in general, because the white line is drawn with paint on the road, there is a case where its type is not recognized or determined due to smudge or dirt. In particular, with respect to the "heavy broken line" painted at the branch point to the exit lane side in the interchange as shown in FIGS. 6 and 13, a large number of vehicles pass on the "heavy broken line" for the lane change, and the "heavy broken line" tends to be unclear due to the smudge. Therefore there is a case where the road condition detection system 1 cannot recognize the white line. In addition, depending on weather, the road condition detection system 1 might not able to recognize the white line.

Furthermore, for instance, even if the white line can be recognized as the white line through the image processing in the road condition detection system 1, there is a case where its type cannot be recognized or identified or judged whether the type is "solid line" or "broken line" or the type is "broken line" or "heavy broken line". In this case, at step S35 in FIG. 12A where the recognition of the white line type is performed, the type of the left side or right side white line is judged to be "unknown (or uncertain)".

Accordingly, the present invention focuses attention on the following point; even when the type of the left side or right side white line is temporarily unknown or uncertain as described above, as long as the vehicle C does not change the traffic lane, the types of the left and right white lines are not changed from their former or previous (or preceding) white line types (i.e. the types of the left and right white lines are the same as their preceding white line types). Then, in the case where the type of the left side or right side white line is unknown or uncertain, the type of a current left side or right side white line is estimated from past white line type information stored in the white line type storage section 9 in the road condition detection system 1 as the travel history data.

For example, at step S44 in FIG. 12B, if the type of the current left side white line of the vehicle C is judged to be "unknown (or uncertain)", on condition that the vehicle does not change the traffic lane by "white line crossing detection=OFF" detected by the white line crossing detection section 11 (at step S45), instead of writing the white line type into the white line type storage section 9, the white line type estimation section 10 accesses and calls the past white line type information stored in the white line type storage section 9 at step S46, and the white line type estimation section 10 estimates the type of the current left side white line of the vehicle C from the past white line type information. Here, the white line type is not written into the white line type storage section 9 at step S46, thus the step S46 is expressed as "no processing". This means that the white line type estimation section 10 estimates that, the preceding left side white line type, which is the type before being judged to be "unknown (or uncertain)", is used as it is, as the type of the current left side white line of the vehicle (i.e. the type of the current left side white line of the vehicle is the same as the preceding left side white line type).

On the other hand, at step S44 in FIG. 12B, if the type of the current left side white line of the vehicle C is judged to be "unknown (or uncertain)" and also it is judged that the lane change is performed by "white line crossing detection=ON" detected by the white line crossing detection section 11, the white line type estimation section 10 judges that the type of the current left side white line is still "unknown (or uncertain)" on the basis of the recognition result of the white line type at step S35, and this information is written into the white line type storage section 9 at step S47.

Here, even in the case where the current left side white line type is "unknown (or uncertain)", as previously explained, since the white line is recognized as the white line, the judgment of the lane change in the left or right direction through the "white line crossing" is unaffected by this "unknown (or uncertain)" case. Further, as described above, even if the left side or right side white line type is temporarily unknown or uncertain at a certain point, when recognizing the white line type at next point, its recognized white line type is written into the white line type storage section 9.

These processing are also executed in a case where the current right side white line type is "unknown (or uncertain)" at steps S49~S52.

Further, as mentioned above, at steps S48 and S53, the left and right white line types recognized at step S35, i.e. correctly recognized left and right white line types, which are identified not as "unknown (or uncertain)", are written into the white line type storage section 9 in the road condition detection system 1 as the travel history data, each time the routine proceeds to steps S48 and S53.

At step S54, left and right white line type information estimated at steps S46 and S51, information of the left and right white line types which are written into the white line type storage section 9 at steps S47, S52 and S48, S53, the detection result of "white line crossing" by the white line crossing detection section 11, and information about presence or absence of the lane change and the direction of the lane change based on the detection result of "white line crossing", are outputted from the road condition detection system 1 to the traffic lane estimation system 2 etc. via the CAN line 5.

When arranging function of the processing in FIGS. 10, 12A and 12B, it is shown by a function block diagram in FIG. 14.

Next, FIGS. 15A and 15B show flow charts of a processing procedure executed in the vehicle-travelling traffic lane estimation section 14 in the traffic lane estimation system 2 of FIG. 3.

The processing in the vehicle-travelling traffic lane estimation section 14 is carried out on the basis of the information from the road condition detection system 1 etc. on condition that the travelling vehicle C is present within the traffic lane estimation area E set ahead of and behind the branch point to the left exit lane on the estimated route as shown in FIG. 9.

In the flow chart in FIG. 15A, information about which side the exit lane exists (i.e. on the left side or the right side) is already known because the navigation system 3 provides this information (at step S41). In the case where the exit lane is on the left side as shown in FIG. 6, at a subsequent step S42, a judgment is made as to whether or not the currently recognized left side white line type is "solid line".

Here, the reason why first the judgment is made as to whether or not the currently recognized left side white line type is "solid line" is that, in the freeway in general, both left and right outermost lines in the vehicle traffic zone are painted as the solid line, and it is most effective in recognizing a left end traffic lane (left end lane) or a right end traffic lane (right end lane).

At step S42, if the left side white line type is "solid line", the routine proceeds to step S43, and a judgment is made as to whether or not the right side white line type is "solid line". If the right side white line type is the "solid line" (i.e. both the left and right white line types are the "solid line"), the routine proceeds to step S44, and it is judged that the vehicle C is travelling on the "left end lane". This is because it can be conceivable that the vehicle is travelling on a road of one lane in each direction (on a road of one lane each way).

On the other hand, at step S43, if the right side white line type is not the "solid line", at a subsequent step S45, a judgment is made as to whether or not the right side white line type is "broken line". If the right side white line type is the "broken line", the routine proceeds to step S46, and it is judged that the vehicle C is travelling on the "left end lane". This is because the right side white line type is the is the "broken line" and it can be conceivable that the vehicle is travelling on the "left end lane" among a plurality of lanes.

At step S45, if the right side white line type is not the "broken line", the routine proceeds to step S47, and the vehicle travelling traffic lane cannot be recognized, and it is judged that the vehicle C is travelling on an "unknown (or uncertain)" lane.

Returning to step S42, if the left side white line type is not "solid line", at a subsequent step S48, a judgment is made as to whether or not the left side white line type is "heavy broken line". If the left side white line type is the "heavy broken line", the routine proceeds to step S49, and a judgment is made as to whether or not the right side white line type is the "solid line". If the right side white line type is the "solid line", the routine proceeds to step S50, and it is judged that the vehicle C is travelling on the "left end lane". This is because the left side white line type is the "heavy broken line" and the right side white line type is the "solid line" and it can be conceivable that the vehicle is travelling on the road of one lane in each direction (on the road of one lane each way).

On the other hand, at step S48, If the left side white line type is not the "heavy broken line", the routine proceeds to step S51, and the vehicle travelling traffic lane cannot be recognized, and it is judged that the vehicle C is travelling on the "unknown (or uncertain)" lane.

At step S49, if the right side white line type is not the "solid line", the routine proceeds to step S52, and a judgment is made as to whether or not the right side white line type is "broken line". If the right side white line type is the "broken line", at step S53, it is judged that the vehicle C is travelling on the "left end lane". This is because the left side white line type is the "heavy broken line" and the right side white line type is the "broken line" and it can be conceivable that the vehicle is travelling on the "left end lane" among the plurality of lanes.

Returning to step S52, if the right side white line type is not the "broken line", the routine proceeds to step S54, and the vehicle travelling traffic lane cannot be recognized, and it is judged that the vehicle C is travelling on the "unknown (or uncertain)" lane.

The above processing is basically the same also in a case where the exit lane is not on the left side but on the right side, and the processing is executed from step S55 in FIG. 15B.

Through these judgment processing in FIGS. 15A and 15B, for instance, in the traffic lane estimation area E in FIG. 9, it becomes possible to unerringly judge or estimate whether at least the vehicle C is travelling on the "left end lane" with the left "solid line" or the left "heavy broken line" being the reference.

Results of the vehicle-travelling traffic lane estimation section 14 are outputted to the traffic lane change judgment section 17 and the branch formation determination section 15 etc. set in the same traffic lane estimation system 2 as necessary, and also outputted to the vehicle control system 4 as needed via the CAN line 5.

Figure 16:
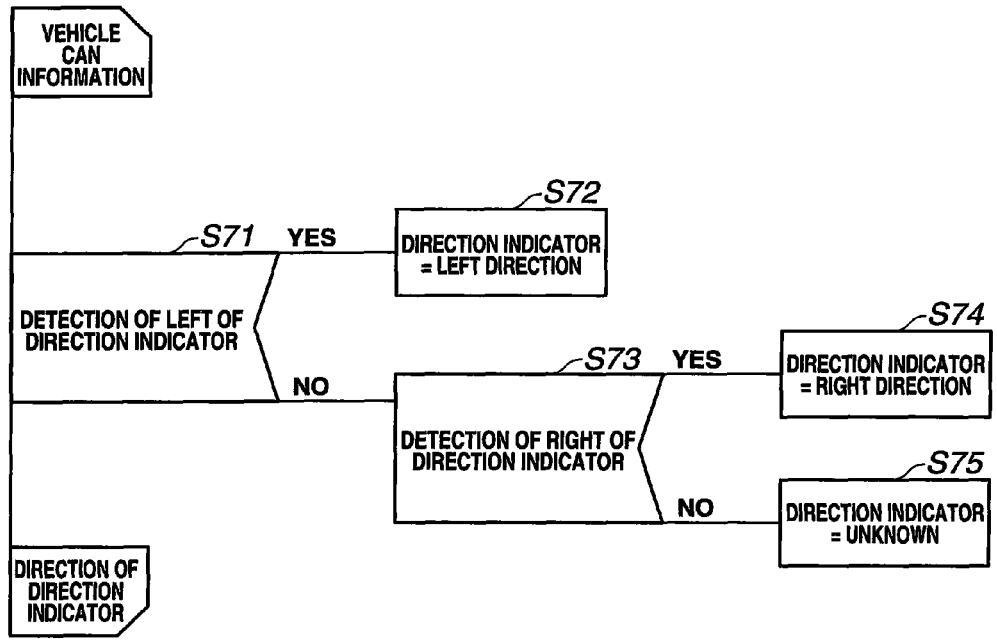
FIG. 16 is a flow chart showing a processing procedure executed in a vehicle movement detection section in the traffic lane estimation system of FIG. 3.

FIG. 16 shows a flow chart of a processing procedure executed in the vehicle movement detection section 16 in the traffic lane estimation system 2 of FIG. 3.

The vehicle movement detection section 16 is a section that detects the "lane change" of the vehicle in the left or right direction on the basis of the driver's operation of the direction indicator or movement of the vehicle itself. As indicated at steps S71~S75, the "lane change" of the vehicle C in the left or right direction is detected on the basis of the operation of the direction indicator. Detection results by the vehicle movement detection section 16 are outputted to the traffic lane change judgment section 17 and the branch formation determination section 15 etc. set in the same traffic lane estimation system 2 as necessary, and also outputted to the vehicle control system 4 as needed via the CAN line 5.

Although these lane change and direction are detected by the "white line crossing" in the flow chart executed in the road condition detection system 1 in FIGS. 12A and 12B (e.g. at steps S38, S39), the vehicle movement detection section 16 detects the lane change and the direction again. The reason why the vehicle movement detection section 16 judges the lane change and its direction again in the flow chart in FIG. 16 is that more accurate judgment of the lane change and the direction is made on the basis of the operation of the direction indicator or the vehicle movement itself.

Here, regarding the vehicle movement, it can be detected by the outputs of the yaw rate sensor and/or the steering angle sensor and others which are installed in the vehicle as a matter of course, not by the direction indicator.

Figure 17:
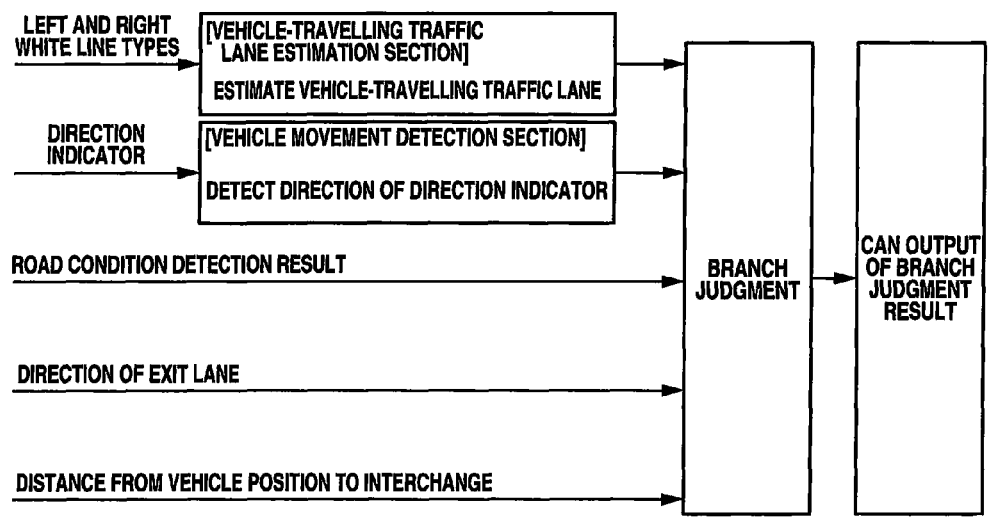
FIG. 17 is a schematic function block diagram of the processing procedure executed in the traffic lane estimation system of FIG. 3.
Figure 18A:
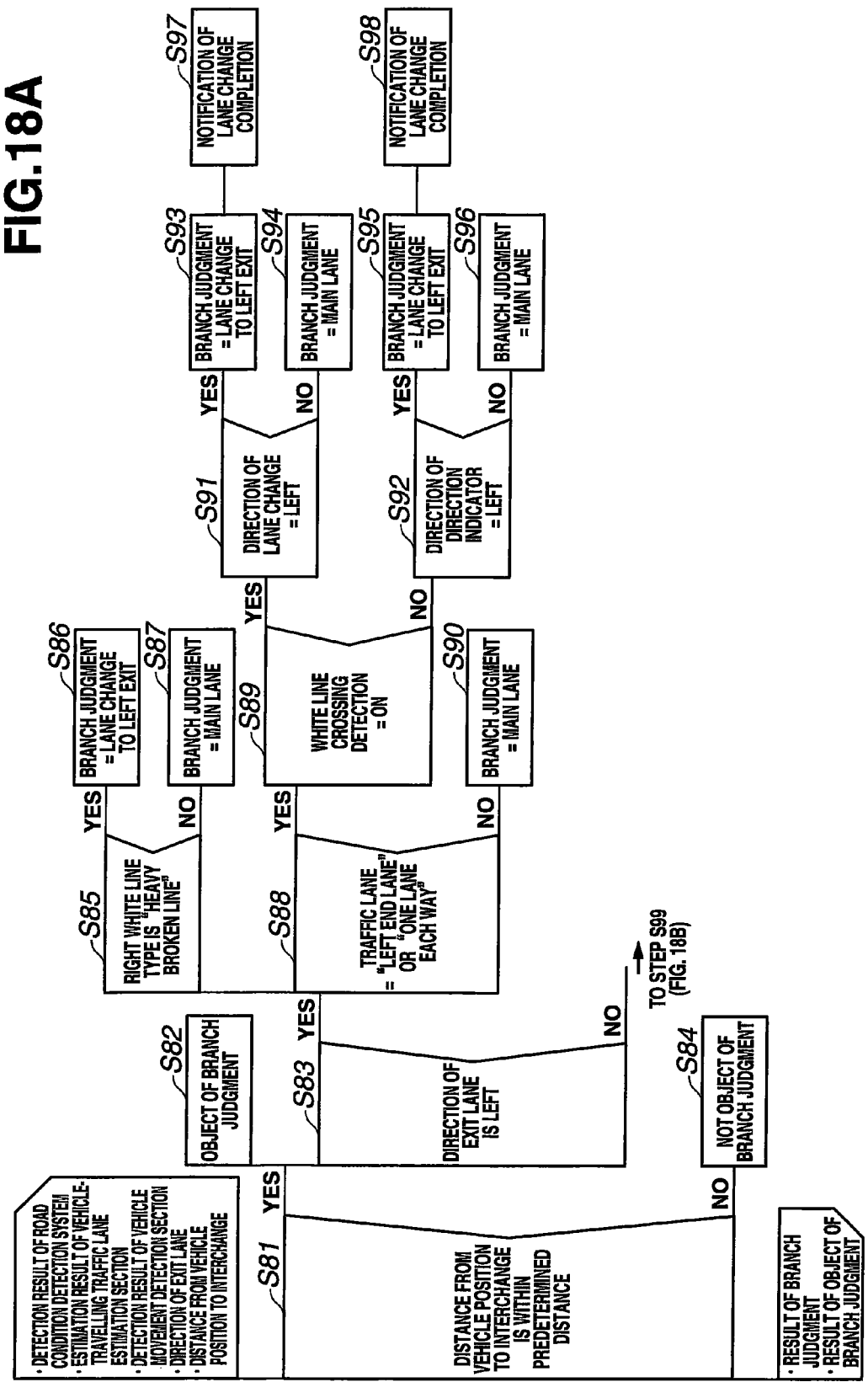
FIGS. 18A and 18B are flow charts showing a processing procedure executed in a traffic lane change judgment section in the traffic lane estimation system of FIG. 3.
Figure 18B:
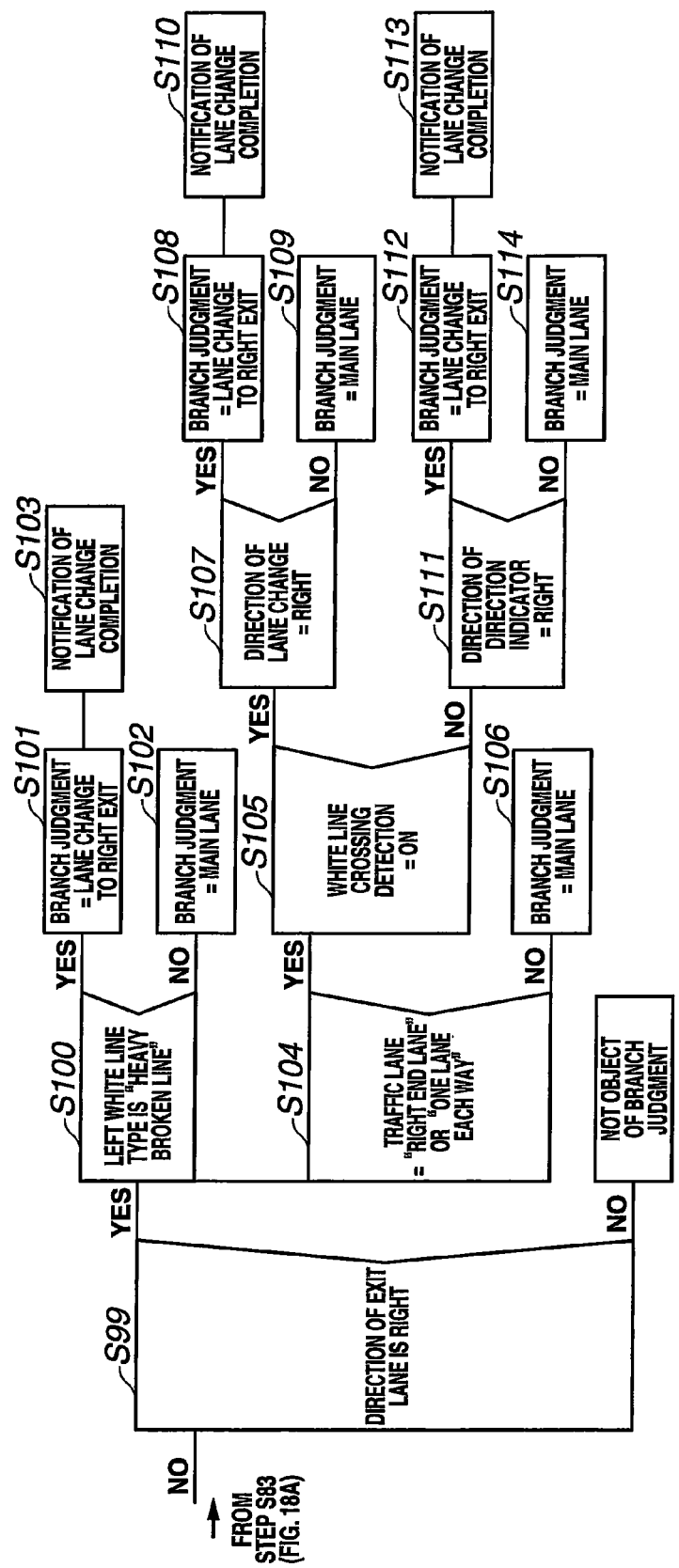

FIG. 17 shows a function block diagram of the traffic lane change judgment section 17 in the traffic lane estimation system 2. FIGS. 18A and 18B show flow charts of a processing procedure executed in the traffic lane change judgment section 17.

Processing in the traffic lane change judgment section 17 is the one that autonomously judges whether the vehicle goes into the exit lane (the vehicle changes the traffic lane to the exit lane) at the branch point in the interchange, for instance, as shown in FIGS. 6 and 9. The processing is performed on the basis of information about a distance to the interchange (the branch node P1) and the direction of the exit lane, which is provided from the navigation system 3, and information from the road condition detection system 1 and the vehicle-travelling traffic lane estimation section 14 also from the vehicle movement detection section 16.

The processing procedure will be explained below. At step S81 in FIG. 18A, a judgment is made as to whether or not the distance from the vehicle position to the interchange, i.e. the distance from the vehicle position to the branch node P1 in FIG. 9, is within a predetermined distance. If the travelling vehicle is present within the predetermined distance, this is judged to be an object of the branch judgment, and the routine proceeds to steps S82, S83. If the travelling vehicle is not present within the predetermined distance (the travelling vehicle is not present within the area of the object of the branch judgment), the routine proceeds to step S54, then the routine is terminated.

At step S83, a judgment is made as to whether or not "direction of the exit lane is left direction" in FIGS. 6 and 9. If the "direction of the exit lane is left direction", the routine proceeds to a subsequent step S85, then a judgment is made as to whether or not the right side white line type is "heavy broken line". If the right side white line type is the "heavy broken line", as indicated at step S86, it is judged that the lane change to the left side exit lane is carried out. If NO at step S85, the routine proceeds to step S87, and it is judged that the vehicle C is still travelling on the main lane. Here, the information about whether the right side white line type is the "heavy broken line" at step S85, is the one that is obtained from the road condition detection system 1.

That is, when recognizing the "heavy broken line" on the right side of the vehicle C within the traffic lane estimation area E in the interchange in FIG. 9, it can be judged that the vehicle changes the lane from the main lane side to the left side exit lane, as shown in FIG. 6.

At step S88, on the basis of the estimation result by the vehicle-travelling traffic lane estimation section 14 in the traffic lane estimation system 2 shown in FIGS. 15A and 15B, a judgment is made as to whether or not the current traffic lane is either one of "left end lane" or "one lane each way". If YES (the current traffic lane is either one of "left end lane" or "one lane each way"), the routine proceeds to a subsequent step S89. If NO, at step S90, it is judged that the vehicle C is still travelling on the main lane.

At step S89, on the basis of the information from processing executed in the road condition detection system 1 shown in FIGS. 12A and 12B, a judgment is made as to whether or not the vehicle C detects the "white line crossing". If the judgment is "white line crossing detection=ON", the routine proceeds to step S91. If the judgment is not "white line crossing detection=ON", the routine proceeds to step S92.

At step S91, a judgment is made as to whether or not the direction of the lane change based on the "white line crossing detection=ON" is left side. If the direction of the lane change is left side, the routine proceeds to step S93, and it is judged that the lane change to the left side exit lane is carried out. On the other hand, if the direction of the lane change is not left side at step S91, at step S94, it is judged that the vehicle C is still travelling on the main lane.

Returning to step S89, if the judgment is not "white line crossing detection=ON", at step S92, a judgment is made as to whether or not the direction of the direction indicator is left ("direction of the direction indicator=left"). If the judgment is "direction of the direction indicator=left", this is judged to be the indication of the lane change by the driver, and at step S95, it is judged that the lane change to the left side exit lane is carried out. On the other hand, if NO (the judgment is not "direction of the direction indicator=left") at step S92, the routine proceed to step S96, and it is judged that the vehicle C is still travelling on the main lane.

The above processing is basically the same also in a case where "direction of the exit lane is right direction", and the processing is executed from step S99.

Processing result by the traffic lane change judgment section 17 in the traffic lane estimation system 2 is outputted to the vehicle control system 4 via the CAN line 5.

With regard to the vehicle control system 4, since it is recognized that the vehicle C already goes into the left side exit lane shown in FIGS. 6 and 9 through the above-mentioned processing, the target vehicle speed computation section 34 in the vehicle control system 4 computes a proper target vehicle speed for going through the exit lane on the basis of the curvature of the curve of the exit lane side which is sent from the navigation system 3. Then the vehicle speed command according to the target vehicle speed is outputted from the vehicle speed command section 35 to the brake control system 37 and the engine control system 38 via the CAN line 5.

With this, for instance, the brake control system 37 drives the brake actuator, and the engine control system 38 drives the throttle actuator, then the vehicle speed control is executed so that the current vehicle speed becomes the target vehicle speed.

Here, in the vehicle driving assistance apparatus, the vehicle is controlled by recognizing the white line type and the vehicle lane change, which is based on the image recognition processing, by the road condition detection system 1. Therefore, as mentioned above, the case where the white line itself cannot be recognized, or the case where although the white line can be detected as the white line, its type cannot be judged or identified, arises. For example, as indicated at steps S47, S54 and S59 in FIGS. 15A and 15B, when the traffic lane cannot be recognized or determined on the basis of the white line type, the judgment of "the vehicle C is travelling on the unknown lane" is made. In this case, despite the vehicle driving assistance apparatus assists the driving at the branch, an effective deceleration control is not performed, then there is a case where an effect which the driver expects is not necessarily achieved.

Therefore, only in the case where the traffic lane change judgment section 17 in the traffic lane estimation system 2 judges the lane change, e.g. only in the case where it is judged that the lane change to the left side exit lane is carried out at steps S93 and S95 etc. in FIG. 18A, a notification or indication of lane change completion is given or issued to the driver as indicated at steps S97 and S98.

For instance, a lane change completion signal is sent from the traffic lane change judgment section 17 to the navigation system 3 via the CAN line 5, and the navigation system 3 indicates the lane change completion to the driver using the voice guidance function or a visible indication function by the HMI section 23. As an example of the voice guidance function, for instance, it is "vehicle goes into the left exit lane now, speed is reduced (this means that since the vehicle goes into the left exit lane, the vehicle is decelerated)".

With this guidance (indication), the driver can notice or understand a judgment state of the vehicle driving assistance apparatus. Thus, when changing the lane to the exit lane, the driver can check whether the deceleration control is carried out, in advance. Hence, this can relieve or resolve driver's anxiety, and also this gives rise to increase of reliability as the vehicle driving assistance apparatus.

As explained above, according to the present embodiment, by and after autonomously recognizing the traffic lane of the vehicle C and the lane change from the main lane to the exit lane, the vehicle speed control according to the curvature of the curve of the exit lane side is executed. It is therefore possible to achieve a safer driving assistance.

In particular, as indicated at steps S46, S51 in FIG. 12B, the present invention focuses attention on the following point; even when the types of the left side and right side white lines defining the traffic lane of the vehicle C are temporarily unknown or uncertain and cannot be recognized due to smudge or dirt, as long as the vehicle C does not change the traffic lane, the types of the left and right white lines are not changed from their former or previous (or preceding) white line types (i.e. the types of the left and right white lines are the same as their preceding white line types). Then, in the case where the types of the left side and right side white lines are unknown or uncertain, the types of the current left side and right side white lines are estimated from the past white line type information stored in the white line type storage section 9 as the travel history data.

Consequently, for instance, even when the road condition detection system 1 cannot recognize the heavy broken line L3 due to smudge or dirt and a state of "unknown" of its white line type continues or persists (a state where although the white line can be detected as the white line, its type (e.g. the solid line or the broken line) cannot be judged or identified, persists) at the branch to the exit lane such as FIG. 6, a travelling state on the left end lane can be continuously maintained on the basis of the "solid line" information of the preceding left side white line as long as the vehicle C does not change the traffic lane. Further, when the direction indicator is operated during the travelling on the left end lane, it is possible to judge that the vehicle goes into the exit lane from the left end lane by the information of the direction indicator, and this increases reliability of the driving assistance at the branch more than ever.

In addition, by estimating the left end or right end lane as described above, even if information concerning the number of lanes is not included in the map data, it is possible to judge that the vehicle goes into the exit lane using the operation information of the direction indicator, then reliability in the branch judgment can be increased.

FIGS. 19 to 30A, 30B show a second embodiment of the vehicle driving assistance apparatus. The second embodiment focuses on the function of the branch formation determination section 15 in the traffic lane estimation system 2.

Figure 19:
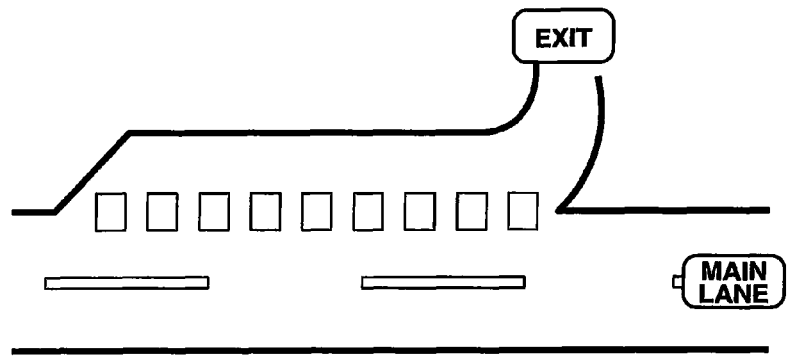
FIG. 19 shows a second embodiment of the vehicle driving assistance apparatus, and shows a basic type of a branch pattern of the exit lane on the freeway.

Regarding the branch of the exit lane in the interchange of the freeway, in the first embodiment, the vehicle control is executed on the assumption that the formation of the branch is the one that is shown in FIG. 19 (a basic or typical branch pattern), i.e. the exit lane and the main lane are separated or defined by the "heavy broken line".

Figure 20:
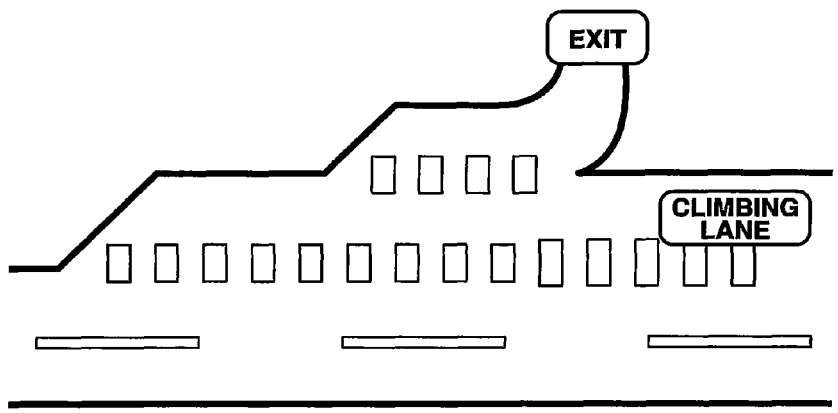
FIG. 20 shows a climbing lane type of the branch pattern of the exit lane on the freeway.

However, not only the "heavy broken line" separates the exit lane or the entrance lane from the main lane as shown in FIG. 19, but a case where the "heavy broken line" indicates a climbing lane (a climbing zone) and the branch lane is contiguous to the climbing lane (the branch lane branches off from the climbing lane) as shown in FIG. 20 exists as well. Further, as another case, as shown in FIG. 21, a case where the "heavy broken line" indicates a deceleration lane (a deceleration zone) and the branch lane is contiguous to the deceleration lane (the branch lane branches off from the deceleration lane) exists.

Figure 21:
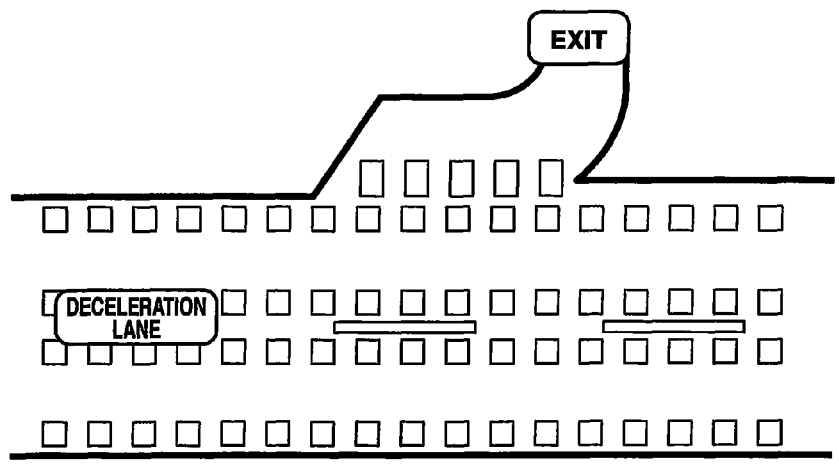
FIG. 21 shows a deceleration lane type of the branch pattern of the exit lane on the freeway.

Because of this, if the traffic lane estimation and the lane change judgment executed in the first embodiment are carried out at the branch point of FIG. 20 or 21, there is a possibility that a wrong branch judgment, which is different from an actual traffic lane position, might be made.

Therefore, in the second embodiment, the vehicle driving assistance apparatus determines or recognizes the shape or formation of the branch point (branch formation) in the case where the branch lane branches off from the climbing lane or the branch lane branches off from the deceleration lane, and by executing the traffic lane estimation and the lane change judgment in accordance with the branch formation, the unerring judgment of the lane change from the main lane to the exit lane can be achieved.

In the present invention, the recognition of the branch formation is performed by the branch formation determination section 15 in the traffic lane estimation system 2. The branch formation determination section 15 is provided with a memory 15a as an information memory section, as shown in FIG. 3.

Figures 22, 23:
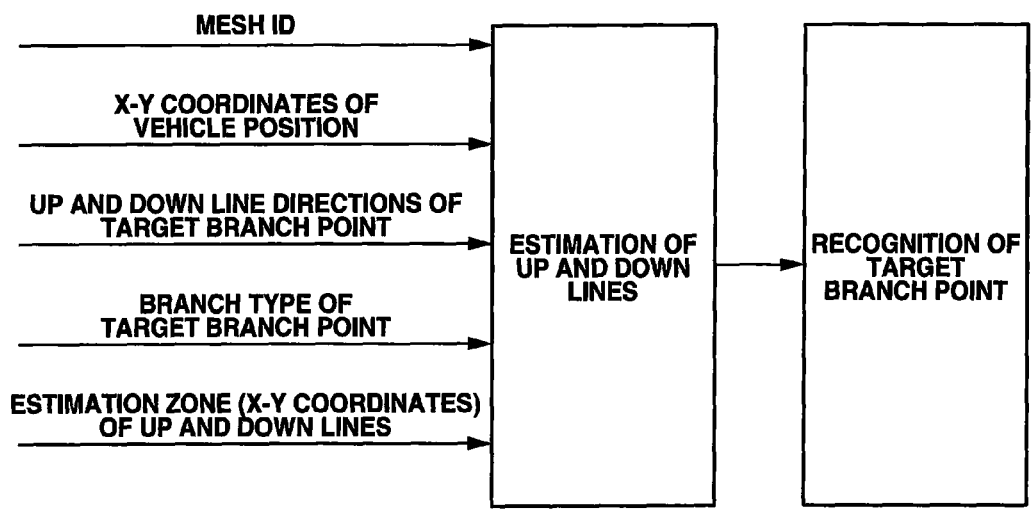
FIG. 22 is a drawing that explains branch types on the freeway.
FIG. 23 is a function block diagram of a branch formation determination section in the traffic lane estimation system of FIG. 3.

With regard to the branch in the freeway, not only the branches in the interchange (IC) shown in FIGS. 19 to 21, but the branch at the service area (SA) or the parking area (PA) and the branch in the junction (JCT) also exist. Types of these branches are provided as information from the navigation system 3, which are, for example, types as shown in FIG. 22. Thus, here, especially in the case where the branch exists in the interchange, its branch formation, i.e. the basic type (basic branch pattern) of FIG. 19 or the climbing lane (climbing zone) type of FIG. 20 or the deceleration lane (deceleration zone) type of FIG. 21, is determined in the processing by the branch formation determination section 15.

As shown in FIG. 23, the branch formation determination section 15 determines the formation of the branch that is ahead of the vehicle on the basis of a mesh ID of the map data of the current vehicle position, X-Y coordinates of the vehicle position, up and down line directions of the target branch point, the branch type of the target branch point, and an estimation zone (X-Y coordinates) of the up and down lines, which are information from the navigation system 3. Here, in FIG. 7 of the first embodiment in which basic processing is the same as the second embodiment, the obtaining of the mesh ID of the map data and the vehicle position X-Y coordinates is written at step S1.

The map data 21 stored in the navigation system 3 shown in FIG. 4 is separated by a mesh of, for instance, a few km square, and each mesh is provided with an individual ID. This ID is then called the mesh ID.

Further, the X-Y coordinates indicate X-Y coordinates on the mesh.

Figure 24:
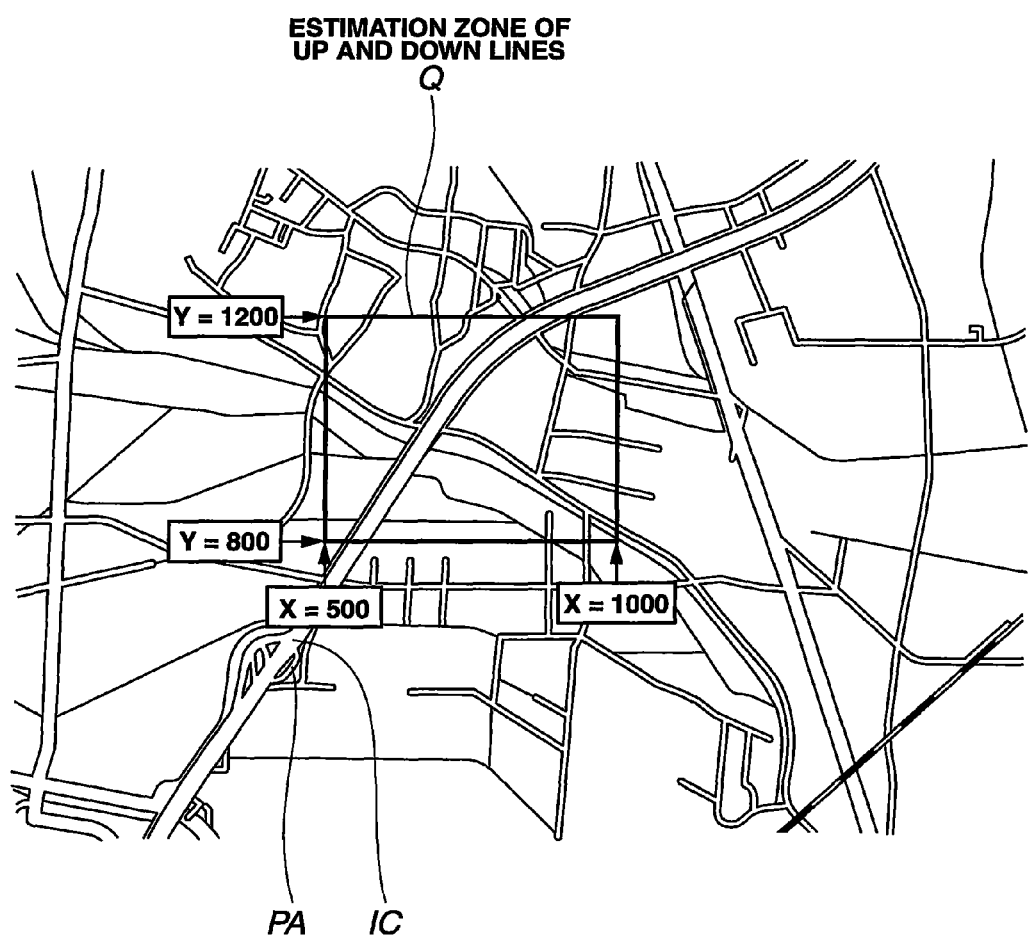
FIG. 24 is an explanation drawing that shows an up and down line estimation zone on the freeway on a map data.

Moreover, as for the estimation zone of the up and down lines, for instance, as shown in FIG. 24, on the mesh where a certain interchange exists, the estimation zone indicates a square area Q of a certain distance, which is previously set by X-Y coordinates.

Then, with regard to the climbing lane (climbing zone) type of FIG. 20 or the deceleration lane (deceleration zone) type of FIG. 21, their sections or areas are pre-stored in the memory 15a of the branch formation determination section 15 as a position data of the mesh ID such as a data form shown in FIG. 25.

Figure 26:
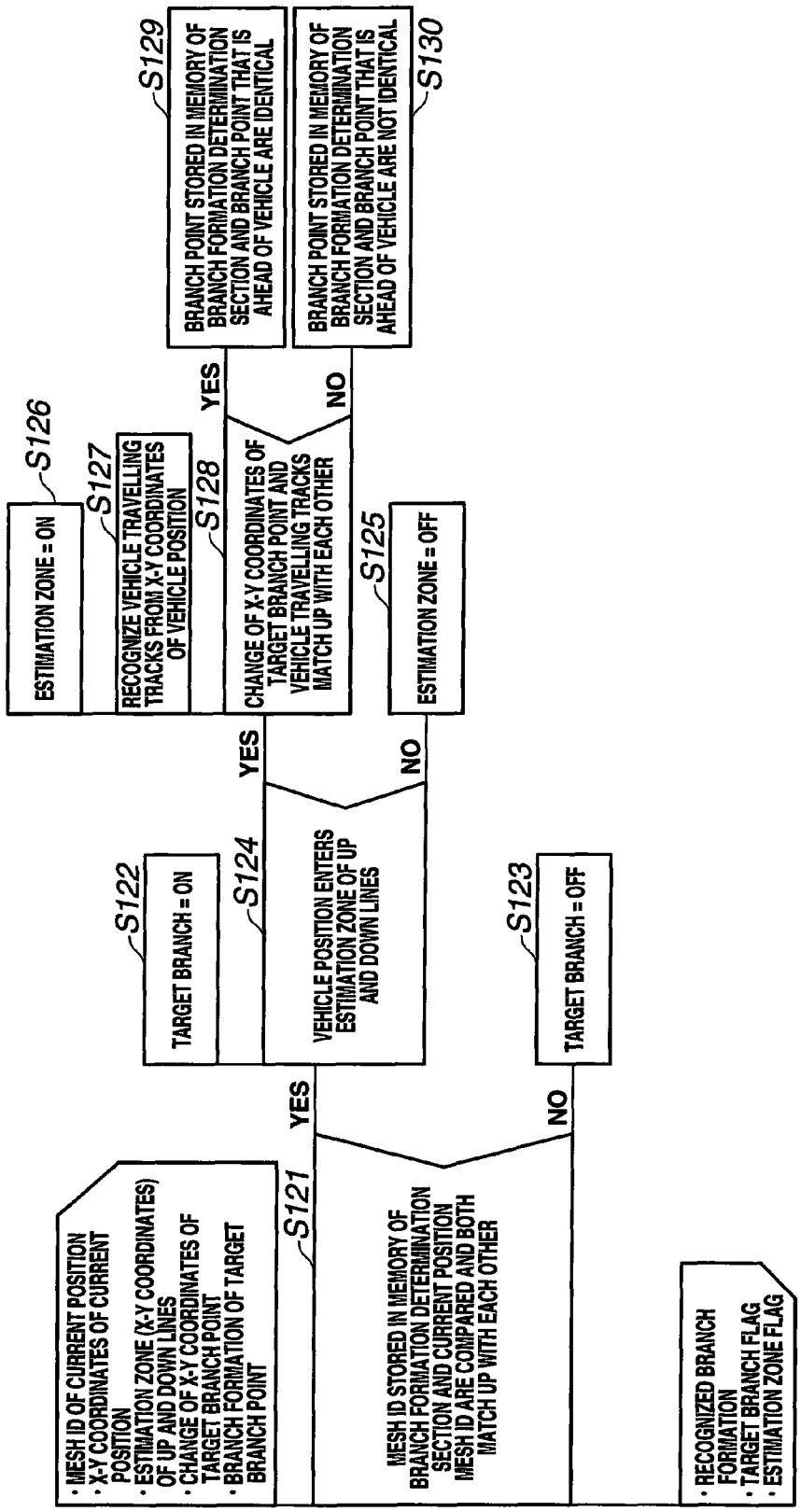
FIG. 26 is a flow chart showing a processing procedure executed in the branch formation determination section in the traffic lane estimation system of FIG. 3.

A detailed processing procedure in the branch formation determination section 15 is shown in FIG. 26.

In the case where the vehicle C goes into the traffic lane estimation area E shown in FIG. 9, a mesh ID of the branch point, which is pre-stored in the memory 15a of the branch formation determination section 15, is read, and this mesh ID and a current vehicle position mesh ID that is sent from the navigation system 3 are compared, then the branch formation determination section 15 checks whether the target branch point is present ahead of the travelling vehicle on the estimated route (at step S121 in FIG. 26).

At step S121, if the target branch point is present ahead of the travelling vehicle, namely that if the pre-stored branch point mesh ID and the current vehicle position mesh ID match up with each other, the routine proceeds to a subsequent step S122, and a target branch flag is set to "ON". If NO at step S121, the routine proceeds to step S123, and the target branch flag is set to "OFF", then the routine is terminated.

Subsequently, in order to prevent an error in judgment of the up and down lines at the branch point in the interchange shown in FIG. 24, only in a case where the vehicle position enters the estimation zone Q of the up and down lines shown FIG. 24 as indicated at step S124, a judgment of the up and down lines is carried out from step S126. If NO (i.e. if the vehicle position does not enter the estimation zone Q) at step S124, the routine proceeds to step S125, and an estimation zone flag is set to "OFF", then the routine is terminated.

At step S124, in the case where the vehicle position enters the estimation zone Q of the up and down lines, after the estimation zone flag is set to "ON" at step S126, by sampling the X-Y coordinates of the vehicle position for a predetermined time, change (increase or decrease) of the X-Y coordinates of the vehicle position is calculated so as to determine or recognize the travelling tracks of the vehicle C at step 127.

Then, at step S128, if the travelling tracks of the vehicle, i.e. the change of the X-Y coordinates of the vehicle position, and a change of the X-Y coordinates of the target branch point match up with each other, the routine proceeds to step S129, and it is judged that the branch point stored in the memory 15a of the branch formation determination section 15 and the branch point that is ahead of the vehicle are identical. That is, it is judged whether the branch point that is ahead of the vehicle is the climbing lane (climbing zone) type of FIG. 20 or the deceleration lane (deceleration zone) type of FIG. 21.

On the other hand, at step S128, if the above both do not match up with each other, the routine proceeds to step S130, and it is judged that the branch point stored in the memory 15a and the branch point that is ahead of the vehicle are not identical. That is, this is the case where the branch point is the basic type (basic branch pattern) of FIG. 19.

Concerning these processing, since the branch formations of a certain branch point of the up and down lines are not necessarily identical with each other, first the vehicle travelling direction is determined. And as shown in FIG. 25, this direction and pre-stored directions of the up and down lines of the branch point are compared. Then, only in a case where the both are identical, it is estimated that the target branch point is present ahead of the vehicle.

These judgment results in the branch formation determination section 15 are outputted to the each section in the traffic lane estimation system 2 and the vehicle control system 4 etc. via the CAN line 5.

With the above processing in the branch formation determination section 15, the branch formation, i.e. the basic type (basic branch pattern) of FIG. 19 or the climbing lane (climbing zone) type of FIG. 20 or the deceleration lane (deceleration zone) type of FIG. 21, can be determined in the traffic lane estimation system 2.

Figure 27:
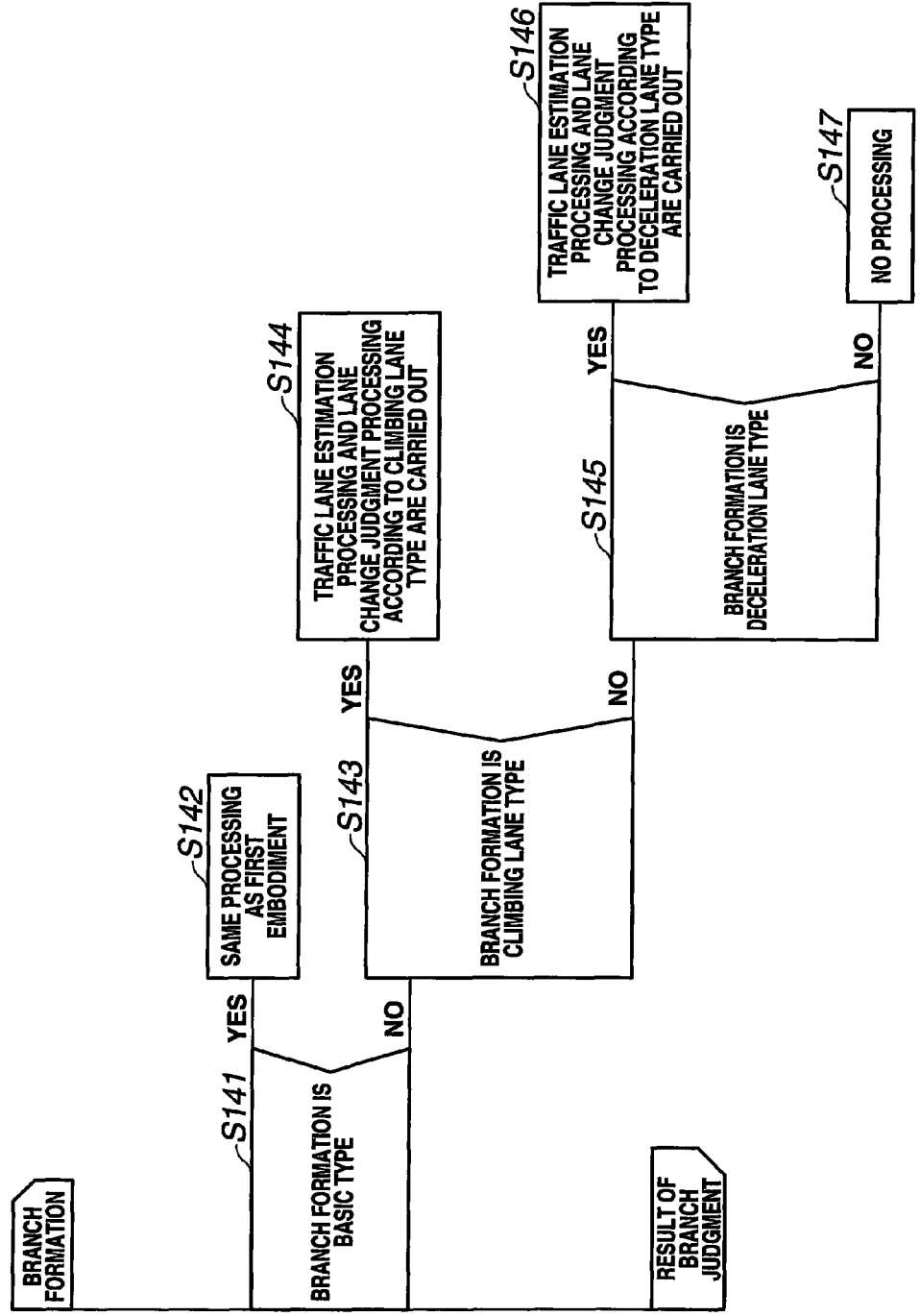
FIG. 27 is a flow chart that roughly shows a processing procedure for each branch pattern of the exit lane shown in FIGS. 19 to 21.

Then, as shown in FIG. 27, in accordance with the each branch formation of the branch point, the traffic lane estimation processing and the lane change judgment processing are executed.

In the FIG. 27, at step S141, if the branch formation is the basic type (basic branch pattern), the routine proceeds to step S142, and the same processing as the processing of FIGS. 15A and 15B of the first embodiment is executed. Further, as indicated at step S143, if the branch formation is the climbing lane (climbing zone) type, as will be explained later, the traffic lane estimation processing and the lane change judgment processing according to the climbing lane type are carried out at step S144. Likewise, as indicated at step S145, if the branch formation is the deceleration lane (deceleration zone) type, as will be explained later, the traffic lane estimation processing and the lane change judgment processing according to the deceleration lane type are carried out at step S146.

Figure 28A:
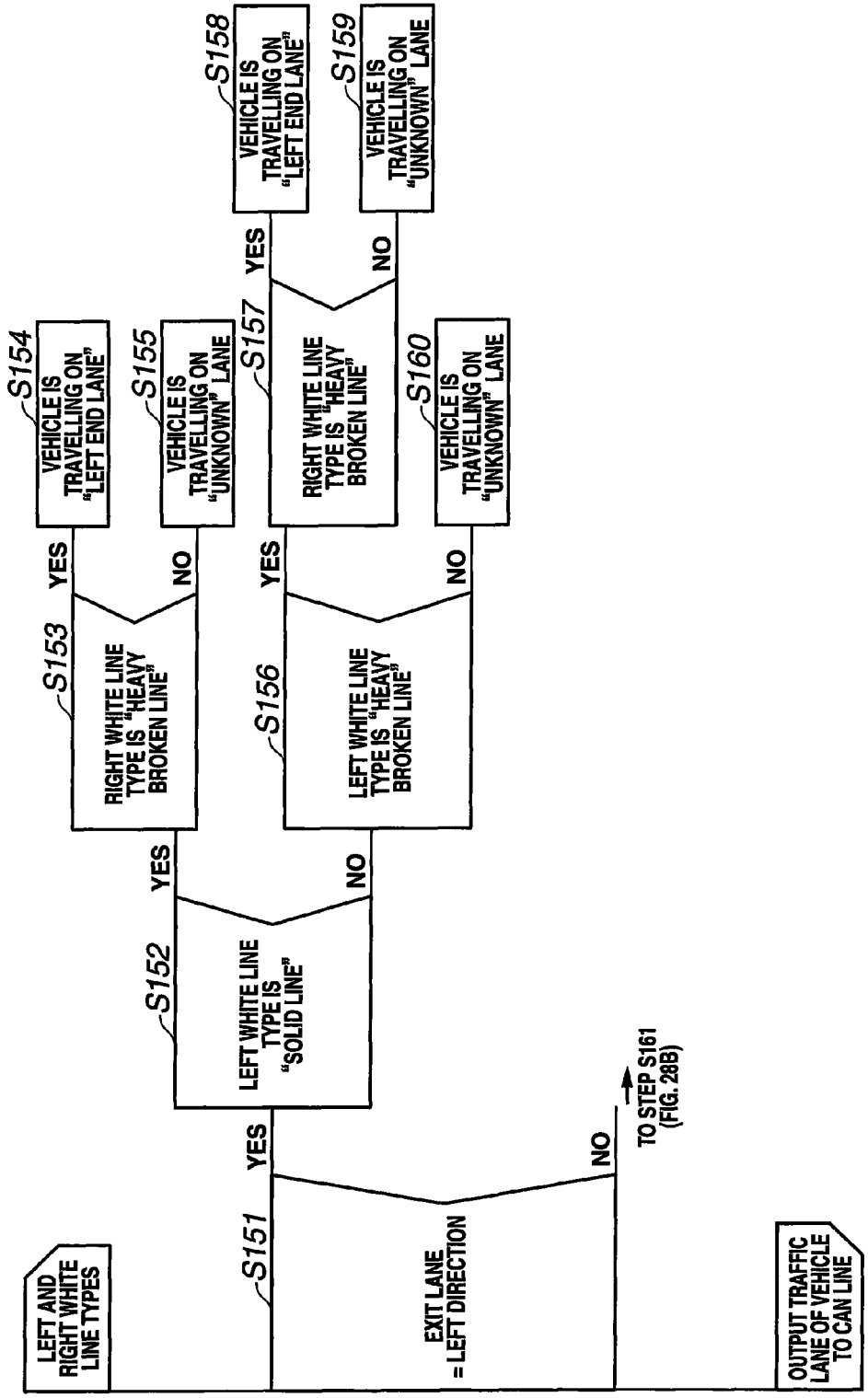
FIGS. 28A and 28B are flow charts showing a vehicle-travelling traffic lane estimation processing for the climbing lane type pattern of FIG. 20.
Figure 28B:
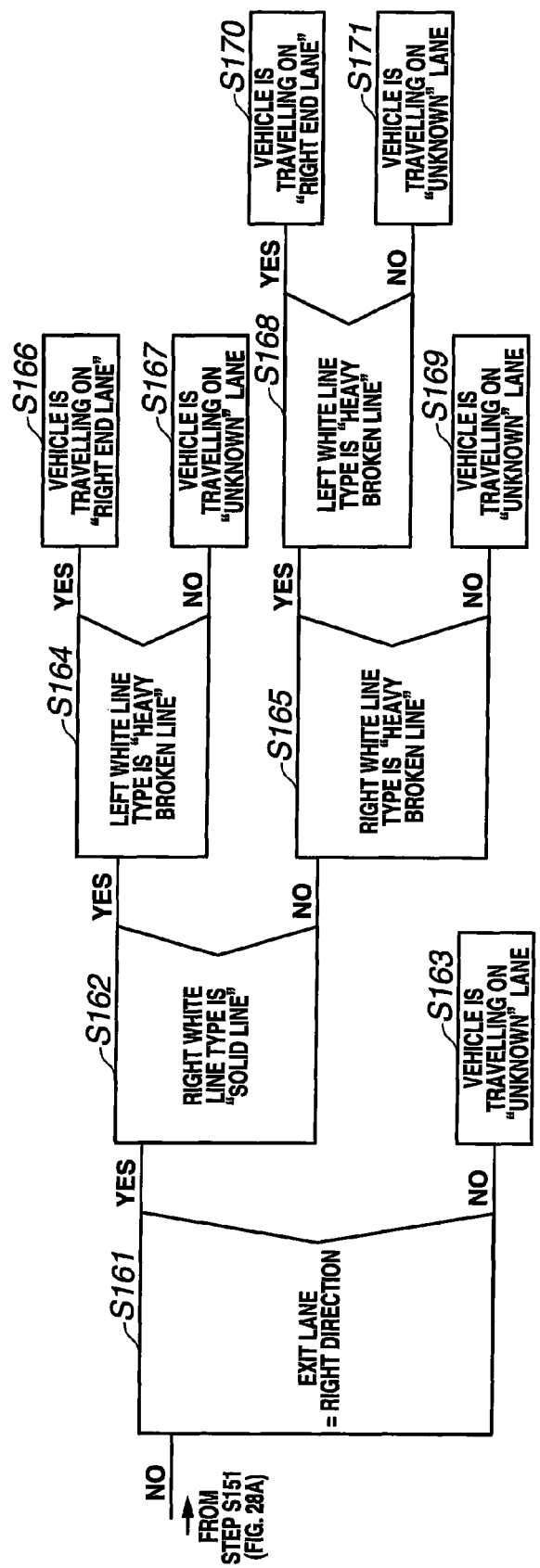

FIGS. 28A and 28B show flow charts of a processing procedure executed in the vehicle-travelling traffic lane estimation section 14 in the case where the branch formation is the climbing lane (climbing zone) type.

At step S151, if the direction of the exit lane is left, the routine proceeds to step S152, and a judgment is made as to whether or not the left side white line type is "solid line". This judgment whether the left side white line type is the "solid line" is the judgment whether the vehicle is travelling on the "left end lane". If the left side white line type is the "solid line", the routine proceeds to step S153, and a judgment is made as to whether or not the right side white line type is "heavy broken line". If the right side white line type is the "heavy broken line", the routine proceeds to step S154, and it is judged that the vehicle is travelling on the "left end lane". If the right side white line type is not the "heavy broken line", at step S155, the vehicle travelling traffic lane cannot be recognized, and it is judged that the vehicle is travelling on the "unknown (or uncertain)" lane.

Returning to step S152, if the left side white line type is not the "solid line", the routine proceeds to step S156, and a judgment is made as to whether or not the left side white line type is "heavy broken line". If the left side white line type is the "heavy broken line", the routine proceeds to step S157, and a judgment is made as to whether or not the right side white line type is "heavy broken line". If the right side white line type is the "heavy broken line", the routine proceeds to step S158, and it is judged that the vehicle is travelling on the "left end lane". If NO (the right side white line type is not "heavy broken line") at step S157, the routine proceeds to step S159, and the vehicle travelling traffic lane cannot be recognized, then it is judged that the vehicle is travelling on the "unknown (or uncertain)" lane.

At step S156, if the left side white line type is not the "heavy broken line", at step S160, the vehicle travelling traffic lane cannot be recognized, and it is judged that the vehicle is travelling on the "unknown (or uncertain)" lane.

The above processing is basically the same also in the case where the exit lane is on the right side, and the processing is executed from step S161 to step S171 in FIG. 28B.

FIG. 29 shows a flow chart of a processing procedure executed in the vehicle-travelling traffic lane estimation section 14 in the case where the branch formation is the deceleration lane (deceleration zone) type.

At step S181, if the direction of the exit lane is left, the routine proceeds to step S182, and a judgment is made as to whether or not the left side white line type is "solid line". If the left side white line type is the "solid line", the routine proceeds to step S183, and it is judged that the vehicle is travelling on the "left end lane". On the other hand, if the left side white line type is not the "solid line", the routine proceeds to step S184, and the vehicle travelling traffic lane cannot be recognized, then it is judged that the vehicle is travelling on the "unknown (or uncertain)" lane.

Here, with respect to the deceleration lane type, as shown in FIG. 21, although the solid line and the heavy broken line are present as a double line, if at least the left side white line type can be recognized as the "solid line", by this recognition, it can be instantly judged that the vehicle is travelling on the "left end lane".

These processing is basically the same also in the case where the exit lane is on the right side, and the processing is executed from step S185 to step S189.

Figure 30A:
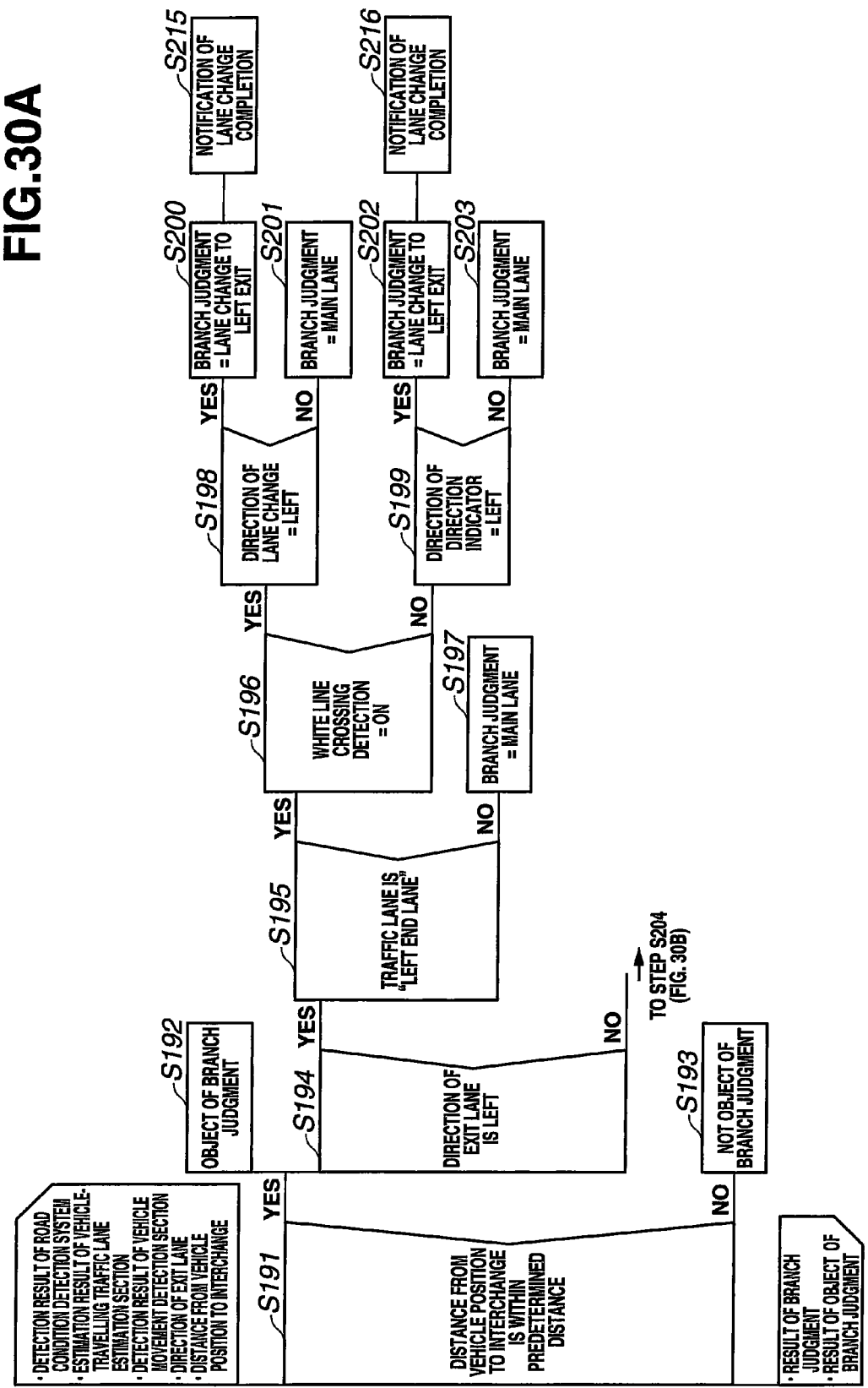

FIGS. 30A and 30B show flow charts of a processing procedure executed in the traffic lane change judgment section 17 for the case where the branch formation is the climbing lane type and the deceleration lane type. This processing procedure is the one that replaces the previously described processing procedure shown in FIGS. 18A and 18B.

At step S191, a judgment is made as to whether or not the distance from the vehicle position to the interchange, i.e. the distance from the vehicle position to the branch node P1 in FIG. 9, is within the predetermined distance. If the travelling vehicle is present within the area of the object of the branch judgment, the routine proceeds to a subsequent step S192. If the travelling vehicle is not present within the area of the object of the branch judgment, the routine is terminated at step S193.

At step S194, a judgment is made as to whether or not "direction of the exit lane is left direction" in FIGS. 20 and 21. If the "direction of the exit lane is left direction", at step S195, a judgment is made as to whether or not the traffic lane is "left end lane". If the vehicle is travelling on the "left end lane", the routine proceeds to step S196. If NO (the vehicle is not travelling on the "left end lane"), the routine proceeds to step S197, and it is judged that the vehicle is still travelling on the main lane.

At step S196, a judgment is made as to whether or not "white line crossing detection is ON". If the judgment is "white line crossing detection=ON", the routine proceeds to step S198, and a judgment is made as to whether or not "direction of the lane change is left". At step S196, if the judgment is not "white line crossing detection=ON", the routine proceeds to step S199, and a judgment is made as to whether or not the direction of the direction indicator is left ("direction of the direction indicator=left").

At step S198, if the judgment is "direction of the lane change=left", the routine proceeds to step S200, and it is judged that the "lane change to the left side exit lane" is carried out. On the other hand, if the judgment is not the "direction of the lane change=left", at step S201, it is judged that the vehicle is still travelling on the main lane.

At step S199, if the judgment is "direction of the direction indicator=left", the routine proceeds to step S202, and it is judged that the "lane change to the left side exit lane" is carried out. If the judgment is not the "direction of the direction indicator=left", at step S203, it is judged that the vehicle is still travelling on the main lane.

The above processing is basically the same also in the case where "direction of the exit lane is right direction", and the processing is executed from step S204 in FIG. 30B. Further, only in the case where it is judged that the lane change to the left side or right side exit lane is carried out at steps S200, S202 and S211, S213, the notification or indication of the lane change completion is given or issued to the driver as indicated at steps S215, S216 and S217, S218, same as the first embodiment.

These processing results in the traffic lane change judgment section 17 are outputted to the vehicle control system 4 via the CAN line 5, same as the first embodiment, then the vehicle speed control including the deceleration control is carried out.

Here, when summarizing conditions for judgment of the left end traffic lane and the right end traffic lane and conditions for judgment of the traffic lane change for each of the basic type (a first pattern) and the climbing lane type (a second pattern) and the deceleration lane type (a third pattern) in the interchange, they are shown in FIG. 31.

According to the second embodiment, by properly choosing the conditions for the vehicle traffic lane estimation and the lane change judgment in accordance with the formation of the interchange, i.e. in accordance with the difference of the branch formation such as the basic type, the climbing lane type and the deceleration lane type, the error in the estimation and judgment can be prevented, and a further increase of reliability as the vehicle driving assistance apparatus can be achieved.

Regarding the branch judgment in the second embodiment, it can be applied to not only the branch judgment in the interchange (IC) but also the branch judgment in the junction (JCT) where main lanes of two or three lanes or more separate into two directions or more.

Figure 32:
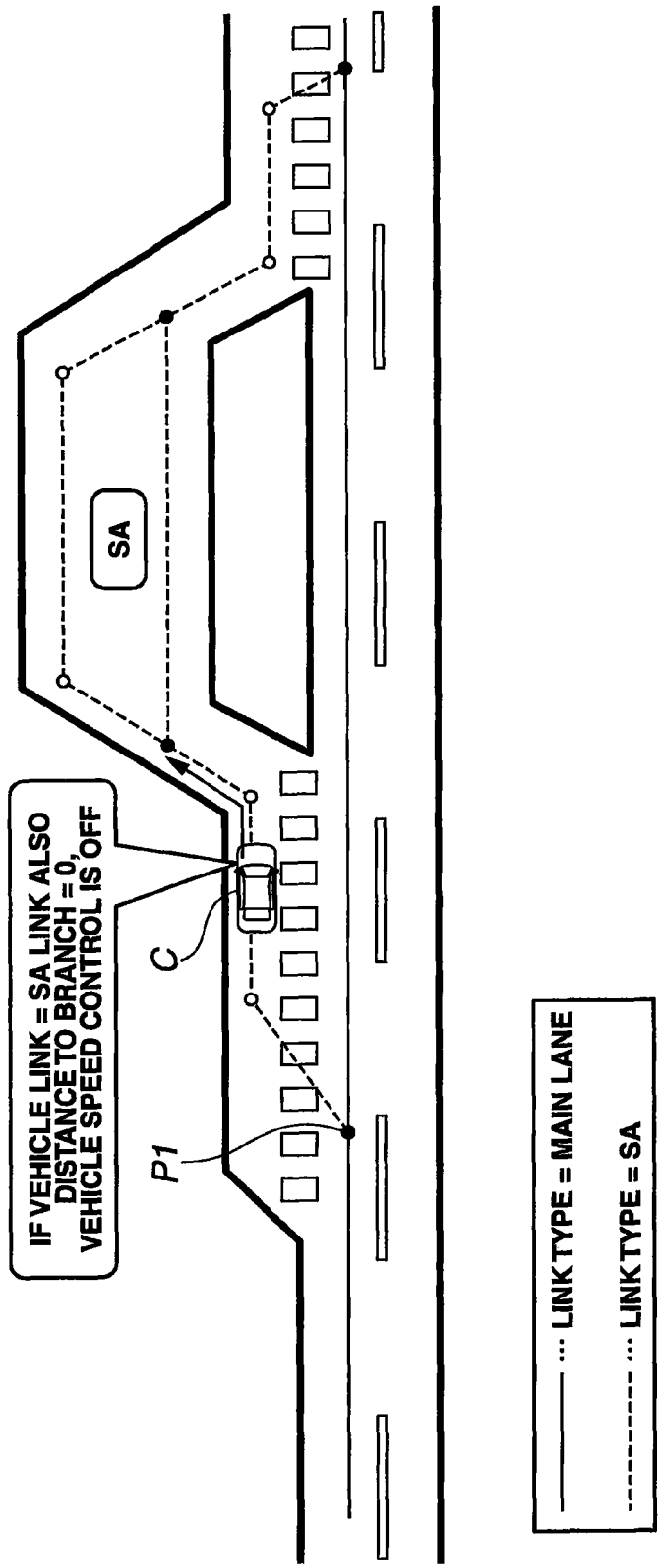
FIG. 32 shows a third embodiment of the vehicle driving assistance apparatus, and shows a drawing of an access lane to a service area (SA).
Figure 33:
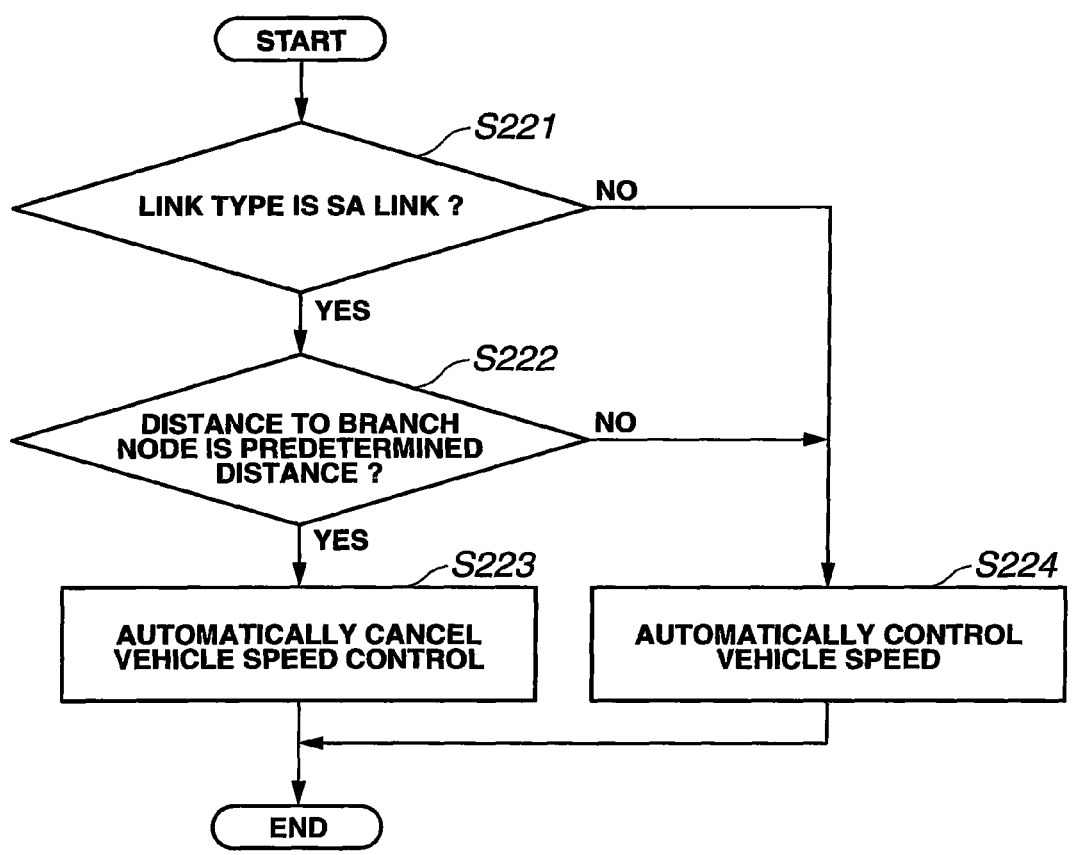
FIG. 33 is a flow chart showing a processing procedure for FIG. 32.

FIGS. 32 to 34 show a third embodiment of the vehicle driving assistance apparatus. The third embodiment focuses on the function of the vehicle speed control automatic cancel section 36 in the vehicle control system 4.

As described above, the branch is present in the interchange (IC) and the junction (JCT), also in the service area (SA) and the parking area (PA) for the entrance lane, in the freeway.

In addition, as previously mentioned, the vehicle driving assistance apparatus computes the target vehicle speed for each point in accordance with the curvature of the link that is ahead of the vehicle on the estimated route, and controls the vehicle speed by sending the vehicle speed command according to the target vehicle speed to the brake control system 37 and the engine control system 38, for executing the vehicle speed control in the so-called automatic vehicle speed mode.

However, because there are pedestrians in the service area (SA) and the parking area (PA), the traveling in the automatic vehicle speed mode is not necessarily preferable.

Therefore, in the third embodiment, in the case where the vehicle goes into the service area (SA) or the parking area (PA) during the travelling in the automatic vehicle speed mode, the vehicle speed control is automatically cancelled.

In the navigation system 3, information as to whether the link type that is ahead of the vehicle is a link type relating to the service area (SA) or the parking area (PA), namely information as to whether the link is an SA link or a PA link, is provided from the map data 21.

Then, as shown in FIGS. 32 and 33, for example, in a case where the link type that is ahead of the vehicle is the SA link and also a distance from the vehicle to a branch node P1, where the SA link branches off, becomes a predetermined distance (e.g. 0 meter), the vehicle speed control automatic cancel section 36 autonomously executes a cancel processing of the vehicle speed control on the basis of the information from the navigation system 3 (at steps S221 to S223 in FIG. 33). In the case where the link type is the PA link as well, the same cancel processing is executed.

With this cancel processing, safety during the travelling in the service area (SA) and the parking area (PA) can be secured.

Here, instead of the automatic cancelling function of the vehicle speed control, the following manner could be employed.

For instance, in some conventional navigation systems, in a case of the service area (SA) shown in FIG. 34, every SA link that is ahead of a second branch node P2 in the service area (SA), which is present ahead of a first branch node P1, is dealt with as a link that has a curvature corresponding to a straight line. For this reason, upon the travelling in the service area (SA), a vehicle speed control according to this curvature of the SA link becomes impossible.

Thus, by using the link recognition function of the navigation system 3, a judgment is made as to whether or not the link type is the SA link. And, if the link type is the SA link, a predetermined curvature for a branch node belonging to the SA link is generated, as a function of the SA speed command section 31, then this is directly sent to the vehicle speed command section 35 as a speed command. Here, this predetermined curvature is a value of curvature required to decelerate the vehicle speed to a safe speed, and is previously set empirically.

With this, between the first branch node P1 and the second branch node P2, the curvature is calculated from the link formation on the map data, and the vehicle speed control according to the curvature is executed. On the other hand, between the second branch node P2 and a final SA link in the service area (SA), the vehicle speed control based on the above special curvature is executed.

In this case as well, when the vehicle goes into the service area (SA) or the parking area (PA), it is possible to decelerate the vehicle speed to the safe speed, and the safety can be secured.

In the present invention, each embodiment has been explained on the basis of circumstances of the road such as traffic division and the white line type in Japan. However, the present invention can be applied in the foreign countries on the basis of their respective road circumstances, by changing the data of the white line type and so on.

The entire contents of Japanese Patent Application No. 2009-071559 filed on Mar. 24, 2009 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A vehicle driving assistance apparatus comprising:
an image capturing system which is installed in a vehicle and captures a road on which the vehicle travels;
a white line type recognition section which recognizes a type of a white line that defines a current traffic lane on which the vehicle is travelling, on the basis of an image captured by the image capturing system;
a white line type storage section which stores the white line type recognized by the white line type recognition section;
a white line type estimation section which estimates the type of the white line defining the current traffic lane from white line types recognized by the white line recognition section ahead of a traffic lane estimation area and stored in the white line type storage section when the white line type cannot be recognized by the white line type recognition section in the traffic lane estimation area which estimates the current traffic lane;
a vehicle control system which executes a vehicle control on the basis of the white line type estimated by the white line type estimation section;
a vehicle-travelling traffic lane estimation section which estimates the current traffic lane of the vehicle on the basis of the white line type recognized by the white line type recognition section;
a branch formation determination section which determines a formation of a branch of the road, which is present ahead of the vehicle, on the basis of information from an external section; and
a traffic lane change judgment section which judges whether the vehicle changes the traffic lane from a main lane to a branch lane side on the basis of the branch formation determined by the branch formation determination section, the traffic lane estimated by the vehicle-travelling traffic lane estimation section and the white line type recognized by the white line type recognition section, wherein
in a case where the branch formation determined by the branch formation determination section is a third pattern, in which white lines on both sides of a traffic lane are recognized as a heavy broken white line and a main lane and a branch lane are separated by a heavy broken white line in a deceleration zone of a main lane, the vehicle-travelling traffic lane estimation section performs the following function (E), and the traffic lane change judgment section performs the following function (F),
(E) as a recognition result of the white line type of the white line type recognition section, when the white line on the left side of the vehicle is recognized as a solid line, it is estimated that the vehicle is travelling on a left end traffic lane, and when the white line on the right side of the vehicle is recognized as the solid line, it is estimated that the vehicle is travelling on a right end traffic lane, and
(F) during the recognition of the vehicle travel on the end traffic lane, when the vehicle crosses the solid line, it is judged that the vehicle changes the traffic lane.

2. A vehicle driving assistance apparatus comprising:
an image capturing system which is installed in a vehicle and captures a road on which the vehicle travels;
a white line type recognition section which recognizes a type of a white line that defines a current traffic lane on which the vehicle is travelling, on the basis of an image captured by the image capturing system;
a white line type storage section which stores the white line type recognized by the white line type recognition section;
a white line type estimation section which estimates the type of the white line defining the current traffic lane from white line types recognized by the white line recognition section ahead of a traffic lane estimation area and stored in the white line type storage section when the white line type cannot be recognized by the white line type recognition section in the traffic lane estimation area which estimates the current traffic lane;
a vehicle control system which executes a vehicle control on the basis of the white line type estimated by the white line type estimation section;
a vehicle-travelling traffic lane estimation section which estimates the current traffic lane of the vehicle on the basis of the white line type recognized by the white line type recognition section;
a branch formation determination section which determines a formation of a branch of the road, which is present ahead of the vehicle, on the basis of information from an external section; and
a traffic lane change judgment section which judges whether the vehicle changes the traffic lane from a main lane to a branch lane side on the basis of the branch formation determined by the branch formation determination section, the traffic lane estimated by the vehicle-travelling traffic lane estimation section and the white line type recognized by the white line type recognition section, wherein
in a case where the branch formation determined by the branch formation determination section is a first pattern, in which a main lane and a branch lane are separated by a heavy broken white line, the vehicle-travelling traffic lane estimation section performs the following function (A), and
the traffic lane change judgment section performs the following function (B),
in a case where the branch formation determined by the branch formation determination section is a second pattern, in which a main lane and a climbing lane, and also a climbing lane and a branch lane, are separated by a heavy broken white line, the vehicle-travelling traffic lane estimation section performs the following function (C), and
the traffic lane change judgment section performs the following function (D), and
in a case where the branch formation determined by the branch formation determination section is a third pattern, in which white lines on both sides of a traffic lane are recognized as a heavy broken white line and a main lane and a branch lane are separated by a heavy broken white line in a deceleration zone of a main lane, the vehicle-travelling traffic lane estimation section performs the following function (E), and
the traffic lane change judgment section performs the following function (F):
(A) as a recognition result of the white line type of the white line type recognition section, when the white line on the left side of the vehicle is recognized as a solid line or a heavy broken line, it is estimated that the vehicle is travelling on a left end traffic lane, and when the white line on the right side of the vehicle is recognized as the solid line or the heavy broken line, it is estimated that the vehicle is travelling on a right end traffic lane;

(B) during the recognition of the vehicle travel on the end traffic lane, when the vehicle crosses the heavy broken line, it is judged that the vehicle changes the traffic lane;

(C) as a recognition result of the white line type of the white line type recognition section, when the white line on the left side of the vehicle is recognized as a solid line and also the white line on the right side of the vehicle is recognized as a heavy broken line, or when the both white lines are recognized as the heavy broken line, it is estimated that the vehicle is travelling on a left end traffic lane, and when the white line on the right side of the vehicle is recognized as the solid line and also the white line on the left side of the vehicle is recognized as the heavy broken line, or when the both white lines are recognized as the heavy broken line, it is estimated that the vehicle is travelling on a right end traffic lane;

(D) during the recognition of the vehicle travel on the end traffic lane, when the vehicle crosses the heavy broken line, it is judged that the vehicle changes the traffic lane;

(E) as a recognition result of the white line type of the white line type recognition section, when the white line on the left side of the vehicle is recognized as a solid line, it is estimated that the vehicle is travelling on a left end traffic lane, and when the white line on the right side of the vehicle is recognized as the solid line, it is estimated that the vehicle is travelling on a right end traffic lane; and (F) during the recognition of the vehicle travel on the end traffic lane, when the vehicle crosses the solid line, it is judged that the vehicle changes the traffic lane.

3. The vehicle driving assistance apparatus as claimed in claim 2, wherein the estimation of the traffic lane by the vehicle-travelling estimation section is started at a time when the vehicle comes to an estimation start position that is previously set ahead of the branch.

4. The vehicle driving assistance apparatus as claimed in claim 2, wherein:
the traffic lane change judgment section estimates the lane change of the vehicle on the basis of the estimation result of the vehicle-travelling estimation section and a direction of a direction indicator of the vehicle.

5. A vehicle driving assistance apparatus comprising:
a camera which is installed in a vehicle and captures a road on which the vehicle travels;
a white line pattern recognition section which recognizes patterns of white lines that are present on left and right sides of the vehicle on the road on the basis of an image captured by the camera;
a vehicle-travelling traffic lane estimation section which estimates a traffic lane of the vehicle on the basis of a recognition result of the white line pattern recognition section;
a white line pattern storage section which stores the white line pattern recognized by the white line pattern recognition section;
a white line pattern estimation section which estimates current white line patterns on the left and right sides of the vehicle from white line patterns recognized by the white line recognition section ahead of a traffic lane estimation area and stored in the white line pattern storage section when the white line pattern cannot be recognized by the white line pattern recognition section in the traffic lane estimation area which estimates the current traffic lane; and
a branch formation determination section which recognizes presence of a branch of the road ahead of the vehicle and determines a formation of the branch on the basis of map data; and a traffic lane change judgment section which judges whether the vehicle changes the traffic lane from a main lane to a branch lane side on the basis of the branch formation determined by the branch formation determination section, the traffic lane estimated by the vehicle-travelling traffic lane estimation section and the white line type recognized by the white line type recognition section, wherein the vehicle control system executes a deceleration control of the vehicle by driving an actuator at least after the judgment of the lane change by the traffic lane change judgment section, wherein, when the white line pattern is recognized by the white line pattern recognition section, the vehicle control system performs the vehicle control on the basis of the recognized white line pattern, and when the white line pattern is not recognized by the white line pattern recognition section, the vehicle control system performs the vehicle control on the basis of the white line pattern estimated by the white line pattern estimation section, and wherein, in a case where the branch formation determined by the branch formation determination section is a first pattern in which a main lane and a branch lane are separated by a heavy broken white line, the vehicle-travelling traffic lane estimation section performs the following function (A), and the traffic lane change judgment section performs the following function (B), in a case where the branch formation determined by the branch formation determination section is a second pattern in which a main lane and a climbing lane, and also a climbing lane and a branch lane are separated by a heavy broken white line, the vehicle-travelling traffic lane estimation section performs the following function (C), and the traffic lane change judgment section performs the following function (D), and in a case where the branch formation determined by the branch formation determination section is a third pattern in which white lines on both sides of a traffic lane are recognized as a heavy broken white line and a main lane and a branch lane are separated by a heavy broken white line in a deceleration zone of a main lane, the vehicle-travelling traffic lane estimation section performs the following function (E), and the traffic lane change judgment section performs the following function (F):

(A) as a recognition result of the white line pattern of the white line pattern recognition section,
when the white line on the left side of the vehicle is recognized as a solid line or a heavy broken line, it is estimated that the vehicle is travelling on a left end traffic lane, and
when the white line on the right side of the vehicle is recognized as the solid line or the heavy broken line, it is estimated that the vehicle is travelling on a right end traffic lane;

(B) during the recognition of the vehicle travel on the end traffic lane,
when the vehicle crosses the heavy broken line, it is judged that the vehicle changes the traffic lane;

(C) as a recognition result of the white line pattern of the white line pattern recognition section,
when the white line on the left side of the vehicle is recognized as a solid line and also the white line on the right side of the vehicle is recognized as a heavy broken line, or when the both white lines are recognized as the heavy broken line, it is estimated that the vehicle is travelling on a left end traffic lane, and when the white line on the right side of the vehicle is recognized as the solid line and also the white line on the left side of the vehicle is recognized as the heavy broken line, or when the both white lines are recognized as the heavy broken line, it is estimated that the vehicle is travelling on a right end traffic lane;

(D) during the recognition of the vehicle travel on the end traffic lane, when the vehicle crosses the heavy broken line, it is judged that the vehicle changes the traffic lane;

(E) as a recognition result of the white line pattern of the white line pattern recognition section, when the white line on the left side of the vehicle is recognized as a solid line, it is estimated that the vehicle is travelling on a left end traffic lane, and when the white line on the right side of the vehicle is recognized as the solid line, it is estimated that the vehicle is travelling on a right end traffic lane; and (F) during the recognition of the vehicle travel on the end traffic lane, when the vehicle crosses the solid line, it is judged that the vehicle changes the traffic lane.

6. The vehicle driving assistance apparatus as claimed in claim 2, wherein:

in a case where the branch formation determined by the branch formation determination section is a first pattern, the vehicle-travelling traffic lane estimation section performs the following function (A), and the traffic lane change judgment section performs the following function (B), in a case where the branch formation determined by the branch formation determination section is a second pattern, the vehicle-travelling traffic lane estimation section performs the following function (C), and the traffic lane change judgment section performs the following function (D), and in a case where the branch formation determined by the branch formation determination section is a third pattern, the vehicle-travelling traffic lane estimation section performs the following function (E), and the traffic lane change judgment section performs the following function (F), (A) as a recognition result of the white line type of the white line type recognition section, when the white line on the left side of the vehicle is recognized as a solid line or a heavy broken line, it is estimated that the vehicle is travelling on a left end traffic lane, and when the white line on the right side of the vehicle is recognized as the solid line or the heavy broken line, it is estimated that the vehicle is travelling on a right end traffic lane, and (B) during the recognition of the vehicle travel on the end traffic lane, when the vehicle crosses the heavy broken line, it is judged that the vehicle changes the traffic lane, (C) as a recognition result of the white line type of the white line type recognition section, when the white line on the left side of the vehicle is recognized as a solid line and also the white line on the right side of the vehicle is recognized as a heavy broken line, or when the both white lines are recognized as the heavy broken line, it is estimated that the vehicle is travelling on a left end traffic lane, and when the white line on the right side of the vehicle is recognized as the solid line and also the white line on the left side of the vehicle is recognized as the heavy broken line, or when the both white lines are recognized as the heavy broken line, it is estimated that the vehicle is travelling on a right end traffic lane, and (D) during the recognition of the vehicle travel on the end traffic lane, when the vehicle crosses the heavy broken line, it is judged that the vehicle changes the traffic lane, (E) as a recognition result of the white line type of the white line type recognition section, when the white line on the left side of the vehicle is recognized as a solid line, it is estimated that the vehicle is travelling on a left end traffic lane, and when the white line on the right side of the vehicle is recognized as the solid line, it is estimated that the vehicle is travelling on a right end traffic lane, and (F) during the recognition of the vehicle travel on the end traffic lane, when the vehicle crosses the solid line, it is judged that the vehicle changes the traffic lane.

7. The vehicle driving assistance apparatus as claimed in claim 6, wherein:

the estimation of the traffic lane by the vehicle-travelling traffic lane estimation section is started at a time when the vehicle comes to an estimation start position that is previously set behind the branch.

8. The vehicle driving assistance apparatus as claimed in claim 6, wherein:

the traffic lane change judgment section estimates the lane change of the vehicle on the basis of the estimation result of the vehicle-travelling traffic lane estimation section and a direction of a direction indicator of the vehicle.

9. The vehicle driving assistance apparatus as claimed in claim 2, further comprising:

an announcement section which gives a notification of lane change completion to a driver after the traffic lane change judgment section judges that the lane change is completed.

10. A vehicle driving assistance apparatus comprising: a camera which is installed in a vehicle and captures a road on which the vehicle travels; a white line pattern recognition section which recognizes patterns of white lines that are present on left and right sides of the vehicle on the road on the basis of an image captured by the camera; a vehicle-travelling traffic lane estimation section which estimates a traffic lane of the vehicle on the basis of a recognition result of the white line pattern recognition section; a white line pattern storage section which stores the white line pattern recognized by the white line pattern recognition section; a white line pattern estimation section which estimates current white line patterns on the left and right sides of the vehicle from white line patterns stored in the white line pattern storage section when the white line pattern cannot be recognized by the white line pattern recognition section; and a vehicle control system which executes a vehicle control on the basis of the recognition result of the white line pattern recognition section and an estimation result of the white line pattern estimation section, and when the white line pattern is recognized by the white line pattern recognition section, the vehicle control system performing the vehicle control on the basis of the recognized white line pattern, and when the white line pattern is not recognized by the white line pattern recognition section, the vehicle control system performing the vehicle control on the basis of the white line pattern estimated by the white line pattern estimation section; a branch formation determination section which recognizes presence of a branch of the road ahead of the vehicle and determines a formation of the branch on the basis of map data; and a traffic lane change judgment section which judges whether the vehicle changes the traffic lane from a main lane to a branch lane side on the basis of the branch formation determined by the branch formation determination section, the traffic lane estimated by the vehicle-travelling traffic lane estimation section and the white line pattern recognized by the white line pattern recognition section, and wherein, the vehicle control system executes a deceleration control of the vehicle by driving an actuator at least after the judgment of the lane change by the traffic lane change judgment section; and wherein: in a case where the branch formation determined by the branch formation determination section is a first pattern, the vehicle-travelling traffic lane estimation section performs the following function (A), and the traffic lane change judgment section performs the following function (B), (A) as a recognition result of the white line pattern of the white line pattern recognition section, when the white line on the left side of the vehicle is recognized as a solid line or a heavy broken line, it is estimated that the vehicle is travelling on a left end traffic lane, and when the white line on the right side of the vehicle is recognized as the solid line or the heavy broken line, it is estimated that the vehicle is travelling on a right end traffic lane, and (B) during the recognition of the vehicle travel on the end traffic lane, when the vehicle crosses the heavy broken line, it is judged that the vehicle changes the traffic lane.

11. The vehicle driving assistance apparatus as claimed in claim 10, wherein:
the vehicle control system executes the deceleration control that decelerates a vehicle speed to a speed according to a curvature of the lane which is recognized on the basis of the map data.

12. The vehicle driving assistance apparatus as claimed in claim 10, wherein:
when there is a service area or a parking area ahead of the branch lane, the vehicle control system executes the deceleration control on the basis of a pre-set speed command proper to the area.

13. The vehicle driving assistance apparatus as claimed in claim 10, wherein:
in a case where the branch formation determined by the branch formation determination section is a second pattern, the vehicle-travelling traffic lane estimation section performs the following function (C), and the traffic lane change judgment section performs the following function (D), (C) as a recognition result of the white line pattern of the white line pattern recognition section, when the white line on the left side of the vehicle is recognized as a solid line and also the white line on the right side of the vehicle is recognized as a heavy broken line, or when the both white lines are recognized as the heavy broken line, it is estimated that the vehicle is travelling on a left end traffic lane, and when the white line on the right side of the vehicle is recognized as the solid line and also the white line on the left side of the vehicle is recognized as the heavy broken line, or when the both white lines are recognized as the heavy broken line, it is estimated that the vehicle is travelling on a right end traffic lane, and (D) during the recognition of the vehicle travel on the end traffic lane, when the vehicle crosses the heavy broken line, it is judged that the vehicle changes the traffic lane.

14. The vehicle driving assistance apparatus as claimed in claim 13, wherein:

in a case where the branch formation determined by the branch formation determination section is a third pattern,
the vehicle-travelling traffic lane estimation section performs the following function (E), and
the traffic lane change judgment section performs the following function (F),
(E) as a recognition result of the white line pattern of the white line pattern recognition section,
when the white line on the left side of the vehicle is recognized as a solid line, it is estimated that the vehicle is travelling on a left end traffic lane, and
when the white line on the right side of the vehicle is recognized as the solid line, it is estimated that the vehicle is travelling on a right end traffic lane, and
(F) during the recognition of the vehicle travel on the end traffic lane,
when the vehicle crosses the solid line, it is judged that the vehicle changes the traffic lane.

15. The vehicle driving assistance apparatus as claimed in claim 10, wherein:
when it is judged that the vehicle is travelling on the left end traffic lane by the vehicle-travelling traffic lane estimation section and also a direction indicator of the vehicle indicates left by a driver's operation, the traffic lane change judgment section estimates that the vehicle changes the traffic lane to a left side.

16. A vehicle driving assistance apparatus comprising: a white line pattern recognition section which recognizes patterns of white lines that are present on left and right sides of a vehicle by an image captured by a camera; a branch formation determination section which recognizes presence of a branch and determines a formation of the branch on the basis of map data; a vehicle-travelling traffic lane estimation section which estimates a traffic lane of the vehicle on the basis of a recognition result of the white line pattern recognition section; a white line pattern storage section which stores the white line pattern recognized by the white line pattern recognition section; a white line pattern estimation section which estimates the white line patterns on the left and right sides of the vehicle from white line patterns stored in the white line pattern storage section when the white line pattern cannot be recognized by the white line pattern recognition section; a traffic lane change judgment section which judges a lane change of the vehicle from a main lane to a branch lane on the basis of the branch formation determined by the branch formation determination section, an estimation result of the vehicle-travelling traffic lane estimation section and the white pattern; and a vehicle control system which executes a deceleration control that decelerates a vehicle speed by driving an actuator at least after the judgment of the lane change by the traffic lane change judgment section
a vehicle-travelling traffic lane estimation section which estimates the current traffic lane of the vehicle on the basis of the white line type recognized by the white line type recognition section;
a branch formation determination section which determines a formation of a branch of the road, which is present ahead of the vehicle, on the basis of information from an external section; and
a traffic lane change judgment section which judges whether the vehicle changes the traffic lane from a main lane to a branch lane side on the basis of the branch formation determined by the branch formation determination section, the traffic lane estimated by the vehicle-travelling traffic lane estimation section and the white line type recognized by the white line type recognition section, wherein in a case where the branch formation determined by the branch formation determination section is a third pattern, in which white lines on both sides of a traffic lane are recognized as a heavy broken white line and a main lane and a branch lane are separated by a heavy broken white line in a deceleration zone of a main lane, the vehicle-travelling traffic lane estimation section performs the following function (E), and the traffic lane change judgment section performs the following function (F), (E) as a recognition result of the white line type of the white line type recognition section, when the white line on the left side of the vehicle is recognized as a solid line, it is estimated that the vehicle is travelling on a left end traffic lane, and when the white line on the right side of the vehicle is recognized as the solid line, it is estimated that the vehicle is travelling on a fight end traffic lane, and (F) during the recognition of the vehicle travel on the end traffic lane, when the vehicle crosses the solid line, it is judged that the vehicle changes the traffic lane.

\* \* \* \* \*